(12) United States Patent
Lee

(10) Patent No.: US 11,740,735 B2
(45) Date of Patent: Aug. 29, 2023

(54) ELECTRONIC DEVICE

(71) Applicant: Samsung Display Co., Ltd., Yongin-Si (KR)

(72) Inventor: Soongyu Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/737,248

(22) Filed: May 5, 2022

(65) Prior Publication Data

US 2023/0043817 A1    Feb. 9, 2023

(30) Foreign Application Priority Data

Aug. 9, 2021 (KR) .......................... 10-2021-0104766

(51) Int. Cl.
  *G06F 3/041*  (2006.01)
  *G06F 3/044*  (2006.01)

(52) U.S. Cl.
  CPC ........ *G06F 3/04166* (2019.05); *G06F 3/0418* (2013.01); *G06F 3/0443* (2019.05); *G06F 3/0446* (2019.05); *G06F 2203/04108* (2013.01)

(58) Field of Classification Search
  CPC .. G06F 3/04166; G06F 3/0418; G06F 3/0443; G06F 3/0446; G06F 2203/04108
  See application file for complete search history.

(56) References Cited

U.S. PATENT DOCUMENTS

| | | | |
|---|---|---|---|
| 10,838,553 B2 | 11/2020 | Jung | |
| 2012/0127124 A1* | 5/2012 | Zanone | G06F 3/0446 345/174 |
| 2012/0280933 A1* | 11/2012 | Lai | G06F 3/04186 345/173 |
| 2013/0050151 A1* | 2/2013 | Tu | G06F 3/044 345/178 |
| 2013/0293511 A1* | 11/2013 | Nam | G06F 3/0443 345/174 |
| 2014/0354590 A1* | 12/2014 | Wang | G06F 3/0443 345/174 |
| 2015/0130756 A1* | 5/2015 | Chang | G06F 3/04166 345/174 |
| 2016/0092026 A1* | 3/2016 | Stevenson | G06F 3/0418 345/174 |
| 2016/0357327 A1* | 12/2016 | Chang | G06F 3/0446 |
| 2019/0286321 A1* | 9/2019 | Kim | G06F 1/3262 |
| 2021/0004135 A1 | 1/2021 | Kim et al. | |

FOREIGN PATENT DOCUMENTS

| | | |
|---|---|---|
| KR | 10-2018-0076512 | 7/2018 |
| KR | 10-2019-0136309 | 12/2019 |
| KR | 10-2021-0003986 | 1/2021 |

* cited by examiner

*Primary Examiner* — Md Saiful A Siddiqui
(74) *Attorney, Agent, or Firm* — F. Chau & Associates, LLC

(57) ABSTRACT

An electronic device including: a display layer configured to display images; a sensor layer disposed on the display layer and including a plurality of first electrodes and a plurality of second electrodes; and a sensor driver configured to drive the sensor layer, wherein the sensor driver is configured to sequentially provide a first driving signal to the plurality of first electrodes and, when the display layer displays a predetermined image, the sensor driver is configured to provide a second driving signal having a frequency different from that of the first driving signal to the plurality of first electrodes.

14 Claims, 14 Drawing Sheets

FIG. 3A
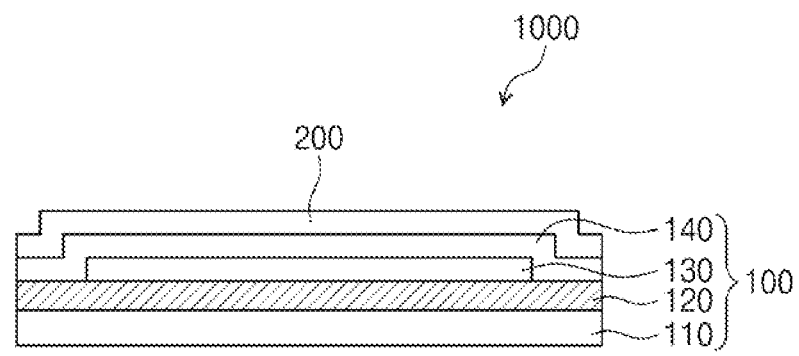
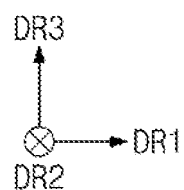
FIG. 3B
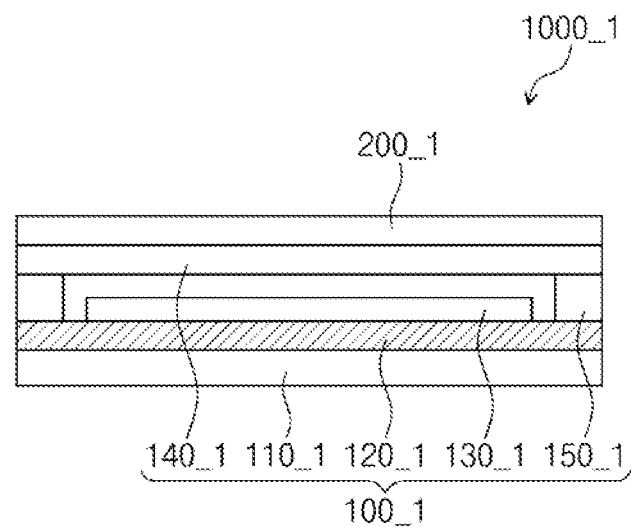
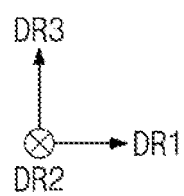

ELECTRONIC DEVICE

CROSS-REFERENCE TO RELATED APPLICATION

This U.S. non-provisional patent application claims priority under 35 U.S.C. § 119 to Korean Patent Application No. 10-2021-0104766, filed on Aug. 9, 2021, the disclosure of which is incorporated by reference herein in its entirety.

TECHNICAL FIELD

The present disclosure relates to an electronic device having a proximity sensing function.

DISCUSSION OF RELATED ART

A display device is an output device for presentation of information in visual form. Various display devices are applied to multimedia electronic devices, such as televisions, mobile phones, tablet computers, navigation systems, and game consoles. The electronic devices may provide a touch-based input method that enables a user to easily input information or commands intuitively and conveniently, in addition to other input methods such as a button, a keyboard, and a mouse.

SUMMARY

An embodiment of the inventive concept provides an electronic device including: a display layer configured to display images; a sensor layer disposed on the display layer and including a plurality of first electrodes and a plurality of second electrodes; and a sensor driver configured to drive the sensor layer, wherein the sensor driver is configured to sequentially provide a first driving signal to the plurality of first electrodes and, when the display layer displays a predetermined image, the sensor driver is configured to provide a second driving signal having a frequency different from that of the first driving signal to the plurality of first electrodes.

A first frequency of the first driving signal may be higher than a second frequency of the second driving signal.

A first frequency of the first driving signal may be higher than a frequency range of the second driving signal.

The frequency of the second driving signal may hop within the frequency range.

The sensor driver may include a lookup table in which frequency information about the frequency range is stored.

The frequency of the second driving signal may swing within the frequency range.

The sensor driver may sequentially provide the second driving signal to the plurality of first electrodes in a proximity sensing mode.

When the sensor driver is in a proximity sensing mode and the display layer displays a still image, the sensor driver may sequentially provide the second driving signal to the plurality of first electrodes.

The sensor driver may determine whether or not the display layer displays the still image on a basis of an amount of change in a sensing value for each frame, which is sensed from the plurality of second electrodes.

When entering a proximity sensing mode, the sensor driver may sequentially provide the second driving signal to the plurality of first electrodes; and when the display layer displays a still image when the sensor driver is in the proximity sensing mode, the sensor driver may sequentially provide the plurality of first electrodes with a third driving signal having a frequency different from that of the second driving signal.

A first frequency of the first driving signal may be higher than a second frequency of the second driving signal; and the second frequency of the second driving signal may be higher than a third frequency of the third driving signal.

The predetermined image may be a dial image, an incoming call image, an outgoing call image, an image during a call, or an image of an application requiring proximity sensing.

The sensor driver may operate in a search mode when entering a proximity sensing mode; and the frequency of the second driving signal may be determined through the search mode.

In the search mode, the sensor driver may output a frequency hopping signal and determine the frequency of the second driving signal on a basis of a signal-to-noise ratio of signals received from the sensor layer for each frequency.

The frequency of the frequency hopping signal may be changed to a different frequency every horizontal period of the sensor driver; and frequencies of the frequency hopping signal may be lower than the frequency of the first driving signal.

The sensor driver may receive a noise-determining signal from the sensor layer, detects noise on a basis of the noise-determining signal, and then determine the frequency of the second driving signal according to a level of the noise.

The sensor driver may sequentially receive sensing signals from the plurality of second electrodes; and the sensor driver may receive the noise-determining signal from at least one first electrode, which is not in the order which the first driving signal or the second driving signal is provided, among the plurality of first electrodes, or from at least one second electrode, which is not in the order to output a sensing signal among the sensing signals, among the plurality of second electrodes.

The sensor layer may operate in a touch sensing mode for detecting a coordinate information of an input that touches the electronic device or in a proximity sensing mode for detecting an object approaching a surface of the electronic device; the sensor layer may include a first region which is activated in the proximity sensing mode and a second region which is adjacent to the first region and deactivated in the proximity sensing mode; and the sensor driver may receive the noise-determining signal from at least one first electrode or a second electrode disposed in the second region among the plurality of first electrodes and the plurality of second electrodes.

The sensor layer may operate in a touch sensing mode for detecting a coordinate information of an input by touching an electronic device or in a proximity sensing mode for detecting an object approaching a surface of the electronic device; the sensor layer may operate at a first frame frequency in the touch sensing mode; and the sensor layer may operate at a second frame frequency equal to or less than the first frame frequency in the proximity sensing mode.

An embodiment of the inventive concept provides an electronic device including: a display layer configured to display images; a sensor layer which is disposed on the display layer and operates in a touch sensing mode for detecting a coordinate information of an input that touches an electronic device, or in a proximity sensing mode for detecting an object approaching a surface of the electronic device; and a sensor driver configured to drive the sensor layer, wherein the sensor driver provides a driving signal to the sensor layer, receives a sensing signal from the sensor layer, and in the proximity sensing mode, changes a frequency of the driving signal according to a level of noise caused by the display layer.

BRIEF DESCRIPTION OF THE FIGURES

The above and other features of the inventive concept will become apparent by describing in detail embodiments thereof with reference to the accompanying drawings. In the drawings:

FIG. 3A is a cross-sectional view of the electronic device according to an embodiment of the inventive concept;

FIG. 3B is a cross-sectional view of an electronic device according to an embodiment of the inventive concept;

DETAILED DESCRIPTION OF THE EMBODIMENTS

Figure 1:
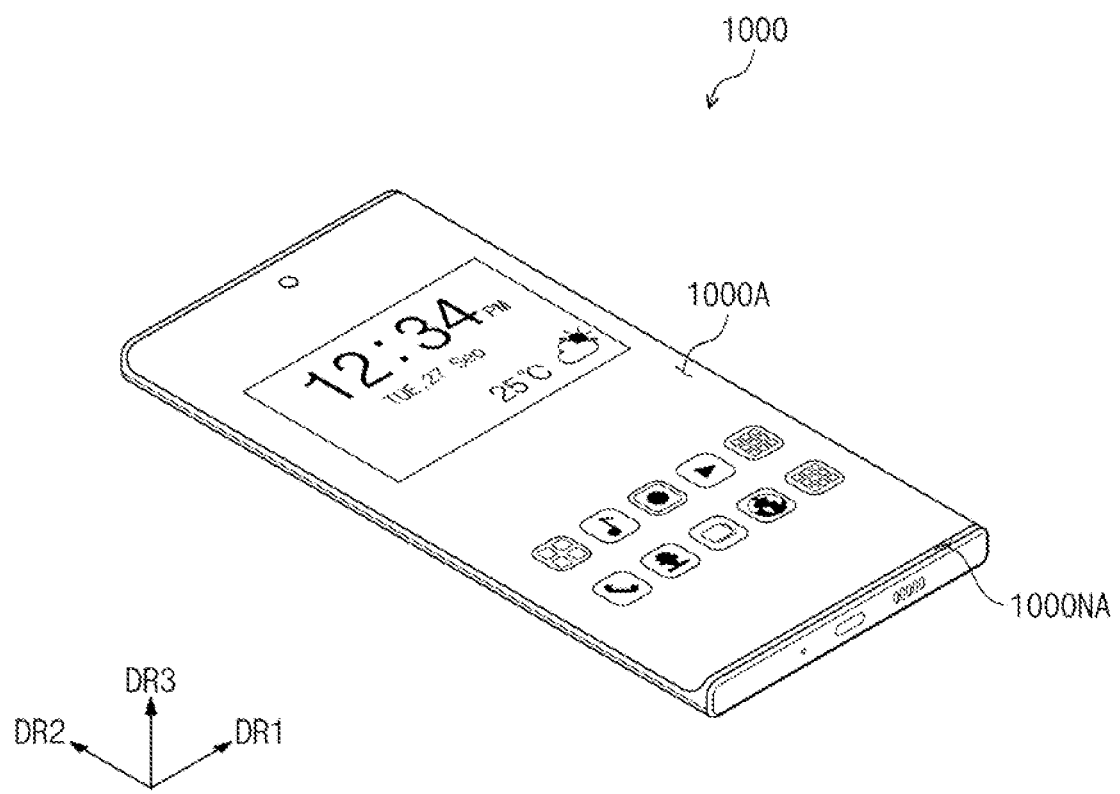
FIG. 1 is a perspective view of an electronic device according to an embodiment of the inventive concept.

In this specification, it will be understood that when an element (or region, layer, part, etc.) is referred to as being "on", "connected to" or "coupled to" another element, it can be directly on, connected or coupled to the other element, or intervening elements may be present.

Like reference numerals may refer to like elements throughout the specification. In addition, in the drawings, the thicknesses, ratios, and dimensions of elements may be exaggerated for effective description of the technical contents. As used herein, the term "and/or"includes any and all combinations of the associated configurations.

It will be understood that, although the terms first, second, etc. may be used herein to describe various elements, these elements should not be limited by these terms. These terms are only used to distinguish one element from another element. For example, a first element could be termed a second element. Similarly, the second element may also be referred to as the first element. The terms of a singular form include plural forms unless otherwise specified.

In addition, terms, such as "below", "lower", "above", "upper" and the like, are used herein for ease of description to describe one element's relation to another element(s) as illustrated in the figures. The above terms are relative concepts and are described based on the directions indicated in the drawings.

It will be understood that the terms "include" and/or "have", when used in this specification, specify the presence of stated features, integers, steps, operations, elements, components and/or groups thereof, but do not preclude the presence or addition of one or more other features, integers, steps, operations, elements, components, and/or groups thereof.

The terms "part" and "unit" may mean a software component or a hardware component that performs a specific function. The hardware component may include, for example, a field-programmable gate array (FPGA) or an application-specific integrated circuit (ASIC). The software component may refer to executable code and/or data used by the executable code in an addressable storage medium. Therefore, software components may be, for example, object-oriented software components, class components, and task components, and include processes, functions, properties, procedures, subroutines, program code segments, drivers, firmware, micro codes, circuits, data, database, data structures, tables, arrangements, or variables.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the inventive concept will be described with reference to the accompanying drawings.

FIG. 1 is a perspective view of an electronic device according to an embodiment of the inventive concept.

Referring to FIG. 1, the electronic device 1000 may be activated according to an electrical signal. For example, the electronic device 1000 may be a mobile phone, a foldable mobile phone, a notebook computer, a television, a tablet, a car navigation system, a game console, or a wearable device, but the inventive concept is not limited thereto. As an example, FIG. 1 illustrates that the electronic device 1000 is a mobile phone.

The electronic device 1000 may have an active region 1000A and a non-active region 1000NA. The electronic device 1000 may display images through the active region 1000A. The active region 1000A may include a surface defined by a first direction DR1 and a second direction DR2. The non-active region 1000NA may surround the periphery of the active region 1000A. In the alternative, the non-active region 1000NA may surround less than all sides of the active region 1000A.

The thickness direction of the electronic device 1000 may be parallel to a third 10 direction DR3 intersecting the first direction DR1 and the second direction DR2. Accordingly, the front surface (or upper surface) and the rear surface (or lower surface) of the members constituting the electronic device 1000 may be defined based on the third direction DR3.

Figure 2:
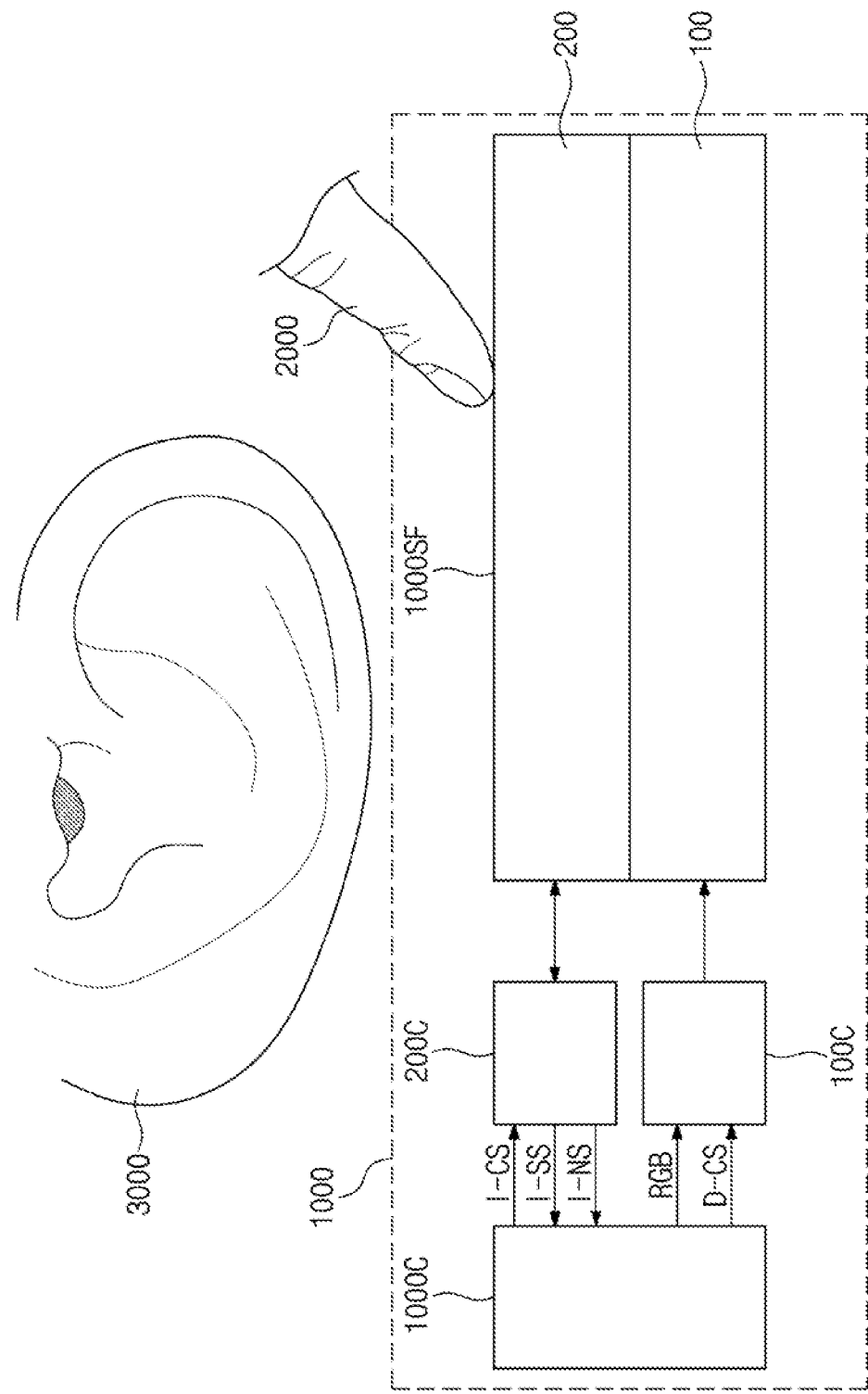
FIG. 2 is a view for explaining the operation of the electronic device according to an embodiment of the inventive concept.

FIG. 2 is a view for explaining the operation of the electronic device according to an embodiment of the inventive concept.

Referring to FIG. 2, the electronic device 1000 may include a display layer 100, a sensor layer 200, a display driver 100C, a sensor driver 200C, and a main driver 1000C.

The display layer 100 may be configured to generate images. The display layer 100 may be a light-emitting display layer. For example, the display layer 100 may be an organic light-emitting display layer, an inorganic light-emitting display layer, an organic-inorganic light-emitting display layer, a quantum dot display layer, a micro light emitting diode (LED) display layer, or a nano LED display layer.

The sensor layer 200 may be disposed on the display layer 100. The sensor layer 200 may sense an external input (e.g., 2000 or 3000) which is applied from the outside. The external input 2000 or 3000 may include any input means capable of providing a change in capacitance. For example, the sensor layer 200 may sense an input not only by a passive input means such as a user's body, but also by an active input means which provides a driving signal.

The main driver 1000C may control the overall operation of the electronic device 1000. For example, the main driver 1000C may control the operation of the display driver 100C and the sensor driver 200C. The main driver 1000C may include at least one microprocessor, and the main driver 1000C may be referred to as a host. The main driver 1000C may further include a graphic controller.

The display driver 100C may drive the display layer 100. The display driver 100C may receive image data RGB and control signals D-CS from the main driver 1000C. The control signals D-CS may include various signals. For example, the control signals D-CS may include an input vertical synchronization signal, an input horizontal synchronization signal, a main clock, a data enable signal, and the like. The display driver 100C may generate a vertical synchronization signal and a horizontal synchronization signal to control the timing for providing a signal to the display layer 100 on the basis of the control signals D-CS.

The sensor driver 200C may drive the sensor layer 200. The sensor driver 200C may receive control signals I-CS from the main driver 1000C. The control signals I-CS may include a clock signal and a mode determination signal for determining a driving mode of the sensor driver 200C.

The sensor driver 200C may calculate the coordinate information of an input on the basis of a signal received from the sensor layer 200 and provide a coordinate signal I-SS having the coordinate information to the main driver 1000C. The main driver 1000C performs an operation corresponding to a user input on the basis of the coordinate signal I-SS. For example, the main driver 1000C may operate the display driver 100C to display a new application image on the display layer 100.

The sensor driver 200C may detect the approach of an object 3000 spaced apart from a surface 1000SF of the electronic device 1000 on the basis of a signal received from the sensor layer 200. The spaced object 3000 may be referred to as a hovering object. As an example of the spaced object 3000, a user's ear approaching the electronic device 1000 is illustrated. It is to be understood, however, that other parts of the user or an input means such as an electronic pen may be the spaced object 3000. The sensor driver 200C may provide the main driver 1000C with a proximity signal I-NS having proximity object detection information. On the basis of the proximity signal I-NS, the main driver 1000C may operate the display driver 100C to reduce the luminance of an image displayed on the display layer 100 or not to display the image on the display layer 100. In other words, the main driver 1000C may turn off the display layer 100.

FIG. 3A is a cross-sectional view of the electronic device according to an embodiment of the inventive concept.

Referring to FIG. 3A, the display layer 100 may include a base layer 110, a circuit layer 120, a light-emitting element layer 130, and an encapsulation layer 140. The base layer 110, the circuit layer 120, the light-emitting element layer 130, and the encapsulation layer 140 may be sequentially stacked.

The base layer 110 may be a member that provides a base surface on which the circuit layer 120 is disposed. The base layer 110 may be a glass substrate, a metal substrate, or a polymer substrate. However, the inventive concept is not limited thereto, and the base layer 110 may be an inorganic layer, an organic layer, or a composite material layer.

The base layer 110 may have a multi-layered structure. For example, the base layer 110 may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. In this specification, "~~"-based resin may mean that a functional group of "~~" is included.

The circuit layer 120 may be disposed on the base layer 110. For example, the circuit layer 120 may be in direct contact with the base layer 110. The circuit layer 120 may include an insulating layer, a semiconductor pattern, a conductive pattern, a signal line, and the like. An insulating layer, a semiconductor layer, and a conductive layer may be formed on the base layer 110 by a method such as coating and deposition, and then, the insulating layer, the semiconductor layer, and the conductive layer may be selectively patterned through a plurality of photolithography processes. Thereafter, the semiconductor pattern, the conductive pattern, and the signal line, which are included in the circuit layer 120, may be formed.

The light-emitting element layer 130 may be disposed on the circuit layer 120. The light-emitting element layer 130 may include a light-emitting element. For example, the light-emitting element layer 130 may include an organic light-emitting material, a quantum dot, a quantum rod, a micro LED, or a nano LED.

The encapsulation layer 140 may be disposed on the light-emitting element layer 130. The encapsulation layer 140 may also cover side surfaces of the light-emitting element layer 130 and directly contact the circuit layer 120. The encapsulation layer 140 may protect the light-emitting element layer 130 from foreign substances such as moisture, oxygen, and dust particles.

The sensor layer 200 may be disposed on the display layer 100. For example, the sensor layer 200 may be disposed on the encapsulation layer 140. The sensor layer 200 may sense an external input applied from the outside. The external input may be a user's input. The user's input may include various types of external inputs, such as a part of the user's body, light, heat, a pen, or pressure.

The sensor layer 200 may be formed on the display layer 100 through a continuous process. In this case, the sensor layer 200 may be disposed directly on the display layer 100. Being directly disposed may mean that a third component is not disposed between the sensor layer 200 and the display layer 100. In other words, a separate adhesive member may not be disposed between the sensor layer 200 and the display layer 100.

Alternatively, the sensor layer 200 and the display layer 100 may be coupled to each other by an adhesive member. The adhesive member may include a conventional adhesive or a glue agent.

The electronic device 1000 may further include an anti-reflection layer and an optical layer which are disposed on the sensor layer 200. The anti-reflection layer may reduce the reflectance of external light incident from the outside of the electronic device 1000. The optical layer may improve the luminance of the front surface of the electronic device 1000 by controlling the direction of light incident from the display layer 100.

FIG. 3B is a cross-sectional view of an electronic device according to an embodiment of the inventive concept.

Referring to FIG. 3B, the electronic device 10001 may include a display layer 100_1 and a sensor layer 200_1. The display layer 1001 may include a base substrate 110_1, a circuit layer 120_1, a light-emitting element layer 130_1, an encapsulation substrate 1401, and a coupling member 150_1.

Each of the base substrate 110_1 and the encapsulation substrate 1401 may be a glass substrate, a metal substrate, or a polymer substrate, but the inventive concept is not particularly limited thereto.

The coupling member 150_1 may be disposed between the base substrate 1101 and the encapsulation substrate 140_1. The coupling member 150_1 may be disposed on opposite sides of the light-emitting element layer 130_1. The coupling member 150_1 may couple the encapsulation substrate 140_1 to the base substrate 110_1 or the circuit layer 1201. The coupling member 150_1 may include an inorganic material or an organic material. For example, the inorganic material may include a frit seal, and the organic material may include a photocurable resin or a photoplastic resin. However, the material constituting the coupling member 150_1 is not limited to the above example.

The sensor layer 200_1 may be disposed directly on the encapsulation substrate 140_1. Being directly disposed may mean that a third component is not disposed between the sensor layer 200_1 and the encapsulation substrate 140_1. In other words, a separate adhesive member may not be disposed between the sensor layer 2001 and the display layer 100_1. However, the inventive concept is not limited thereto, and an adhesive layer may be further disposed between the sensor layer 200_1 and the encapsulation substrate 140_1.

Figure 4:
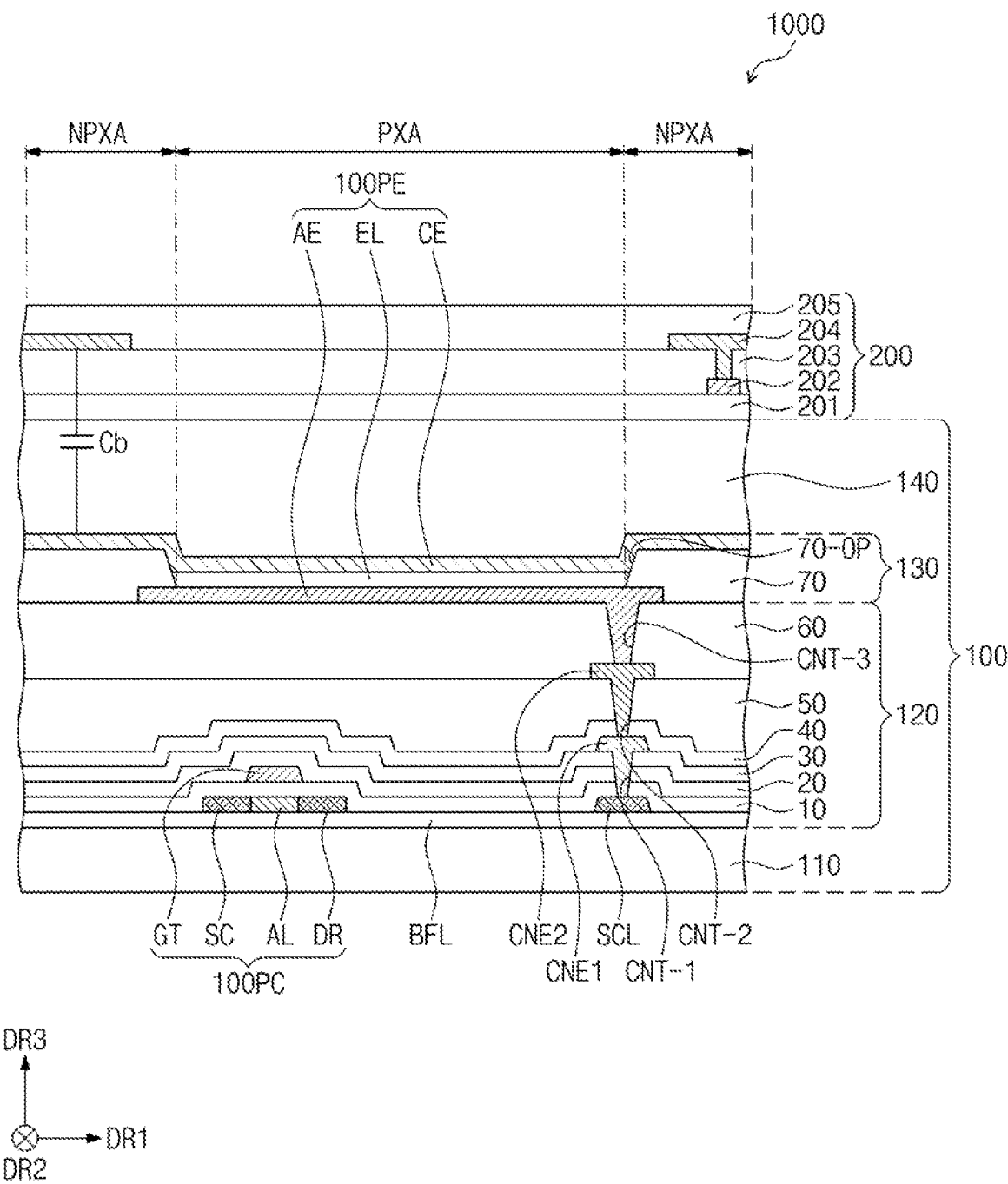
FIG. 4 is a cross-sectional view of the electronic device according to an embodiment of the inventive concept.

FIG. 4 is a cross-sectional view of the electronic device according to an embodiment of the inventive concept.

Referring to FIG. 4, at least one inorganic layer is formed on the upper surface of the base layer 110. The inorganic layer may include at least one of aluminum oxide, titanium oxide, silicon oxide, silicon nitride, silicon oxynitride, zirconium oxide, or hafnium oxide. The inorganic layer may be formed in multiple layers. The multi-layered inorganic layers may constitute a barrier layer and/or a buffer layer. In this embodiment, the display layer 100 is illustrated as including a buffer layer BFL.

The buffer layer BFL may improve a bonding force between the base layer 110 and the semiconductor pattern. The buffer layer BFL may include at least one of silicon oxide, silicon nitride, or silicon oxynitride. For example, the buffer layer BFL may include a structure in which a silicon oxide layer and a silicon nitride layer are alternately stacked.

The semiconductor pattern may be disposed on the buffer layer BFL. The semiconductor pattern may contain polysilicon. However, the inventive concept is not limited thereto, and the semiconductor pattern may contain amorphous silicon, low-temperature polycrystalline silicon, or oxide semiconductor.

FIG. 4 illustrates just a portion of the semiconductor pattern, and therefore, the semiconductor pattern may be further disposed in another region. The semiconductor pattern may be arranged across pixels according to a specific rule. The semiconductor pattern may have different electrical properties depending on whether it is doped or not. The semiconductor pattern may include a first region having high conductivity and a second region having low conductivity. The first region may be doped with an n-type dopant or a p-type dopant. A p-type transistor may include a doped region doped with the p-type dopant, and an n-type transistor may include a doped region doped with the n-type dopant. The second region may be a non-doped region or a region doped with a concentration lower than that of the first region.

The conductivity of the first region may be greater than that of the second region, and the first region may serve as an electrode or signal line. The second region may correspond to an active layer (or channel) of a transistor. In other words, one portion of the semiconductor pattern may be the active layer of the transistor, another portion thereof may be a source or drain of the transistor, and still another portion thereof may be a connection electrode or a connection signal line.

Each of the pixels may have an equivalent circuit including seven transistors, one capacitor, and a light-emitting element, and the equivalent circuit diagram of the pixel may be modified in various forms. For example, FIG. 4 illustrates a transistor 100PC and a light-emitting element 100PE, which are included in the pixel.

A source region SC, an active region AL, and a drain region DR of the transistor 100PC may be formed from the semiconductor pattern. The source region SC and the drain region DR may extend in opposite directions from each other from the active region AL on a cross section. FIG. 4 illustrates a portion of the connection signal line SCL formed from the semiconductor pattern. The connection signal line SCL may be connected to the drain region DR of the transistor 100PC on a plane.

A first insulating layer 10 may be disposed on the buffer layer BFL. The first insulating layer 10 may overlap a plurality of pixels in common and cover the semiconductor pattern. The first insulating layer 10 may be an inorganic layer and/or an organic layer and have a single-layered or multi-layered structure. The first insulating layer 10 may contain at least one of aluminum oxide, titanium oxide, silicon oxide, silicon nitride, silicon oxynitride, zirconium oxide, or hafnium oxide. In this embodiment, the first insulating layer 10 may be a single-layered silicon oxide layer. Not only the first insulating layer 10 but also the insulating layers of the circuit layer 120 to be described later may be an inorganic layer and/or an organic layer and have a single-layered or multi-layered structure. The inorganic layer may contain at least one of the materials described above, but the inventive concept is not limited thereto.

A gate GT of the transistor 100PC is disposed on the first insulating layer 10. The gate GT may be a portion of a metallic pattern. The gate GT overlaps the active region AL. For example, the gate GT overlaps the active region AL with the first insulating layer 10 therebetween. In the process of doping the semiconductor pattern, the gate GT may function as a mask.

A second insulating layer 20 may be disposed on the first insulating layer 10 and cover the gate GT. The second insulating layer 20 may overlap the pixels in common. The second insulating layer 20 may be an inorganic layer and/or an organic layer and have a single-layered or multi-layered structure. The second insulating layer 20 may include at least one of silicon oxide, silicon nitride, or silicon oxynitride. In this embodiment, the second insulating layer 20 may have a multi-layered structure including a silicon oxide layer and a silicon nitride layer.

A third insulating layer 30 may be disposed on the second insulating layer 20. The third insulating layer 30 may have a single-layered or multi-layered structure. For example, the third insulating layer 30 may have a multi-layered structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 passing through the first, second and third insulating layers 10, 20, and 30. The first connection electrode CNE1 may form a protrusion on the surface of the third insulating layer 30.

A fourth insulating layer 40 may be disposed on the third insulating layer 30. The fourth insulating layer 40 may be a single-layered silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 passing through the fourth insulating layer 40 and the fifth insulating layer 50. The second connection electrode CNE2 may form a protrusion on the surface of the fifth insulating layer 50.

A sixth insulating layer 60 may be disposed on the fifth insulating layer 50 and cover the second connection electrode CNE2. The sixth insulating layer 60 may be an organic layer.

The light-emitting element layer 130 may be disposed on the circuit layer 120. The light-emitting element layer 130 may include the light-emitting element 100PE. For example, the light-emitting element layer 130 may contain an organic light-emitting material, an inorganic light-emitting material, a quantum dot, a quantum rod, a micro LED, or a nano LED. Hereinafter, the light-emitting element 100PE will be described as an organic light-emitting element, but the inventive concept is not particularly limited thereto.

The light-emitting element 100PE may include a first electrode AE, a light-emitting layer EL, and a second electrode CE.

The first electrode AE may be disposed on the sixth insulating layer 60. The first electrode AE may be connected to the second connection electrode CNE2 through a contact hole CNT-3 passing through the sixth insulating layer 60. The first electrode AE may be extended along the surface of the sixth insulating layer 60 and overlap the transistor 100PC.

A pixel defining film 70 may be disposed on the sixth insulating layer 60 and cover a portion of the first electrode AE. The pixel defining film 70 has an opening 70-OP formed therein. The opening 70-OP of the pixel defining film 70 exposes at least a portion of the first electrode AE.

The active region 1000A (see FIG. 1) may include a light-emitting region PXA and a non-light-emitting region NPXA adjacent to the light-emitting region PXA. The non-light-emitting region NPXA may surround the light-emitting region PXA. In this embodiment, the light-emitting region PXA corresponds to a partial region of the first electrode AE exposed by the opening 70-OP.

The light-emitting layer EL may be disposed on the first electrode AE. The light-emitting layer EL may be disposed in a region corresponding to the opening 70-OP. In other words, the light-emitting layer EL may be formed by being separated into each of the pixels. When the light-emitting layer EL is formed by being separated into each of the pixels, each of the light-emitting layers EL may emit light in at least one of blue, red, or green. However, the inventive concept is not limited thereto, and the light-emitting layer EL may be connected to the pixels to be provided in common. In this case, the light-emitting layer EL may provide blue light or white light.

The second electrode CE may be disposed on the light-emitting layer EL. The second electrode CE may have an integrated shape and be disposed in common in a plurality of pixels.

A hole control layer may be disposed between the first electrode AE and the light-emitting layer EL. The hole control layer may be disposed in common in the light-emitting region PXA and the non-light-emitting region NPXA. The hole control layer may include a hole transport layer and further include a hole injection layer. An electronic control layer may be disposed between the light-emitting layer EL and the second electrode CE. The electronic control layer may include an electronic transport layer and further include an electronic injection layer. The hole control layer and the electronic control layer may be formed in common in a plurality of pixels by using an open mask.

The encapsulation layer 140 may be disposed on the light-emitting element layer 130. The encapsulation layer 140 may include an inorganic layer, an organic layer, and an inorganic layer which are sequentially stacked, but layers constituting the encapsulation layer 140 are not limited thereto.

The inorganic layers may protect the light-emitting element layer 130 from moisture and oxygen, and the organic layer may protect the light-emitting element layer 130 from foreign materials such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer, but the inventive concept is not limited thereto.

The sensor layer 200 may include a base layer 201, a first conductive layer 202, a sensing insulating layer 203, a second conductive layer 204, and a cover insulating layer 205. The base layer 201, the first conductive layer 202, the sensing insulating layer 203, the second conductive layer 204, and the cover insulating layer 205 may be sequentially stacked.

The base layer 201 may be an inorganic layer containing at least any one of silicon nitride, silicon oxynitride, or silicon oxide. Alternatively, the base layer 201 may be an organic layer containing an epoxy resin, an acrylic resin, or an imide-based resin. The base layer 201 may have a single-layered structure, or a multi-layered structure stacked along the third direction DR3.

Each of the first conductive layer 202 and the second conductive layer 204 may have a single-layered structure or a multi-layered structure stacked along the third direction DR3.

The single-layered conductive layer may include a metal layer or a transparent conductive layer. The metal layer may contain molybdenum, silver, titanium, copper, aluminum, or an alloy thereof. The transparent conductive layer may contain a transparent conductive oxide such as indium tin oxide (ITO), indium zinc oxide (IZO), zinc oxide (ZnO), or indium zinc tin oxide (IZTO). In addition, the transparent conductive layer may contain conductive polymer such as PEDOT, metal nanowire, graphene, and the like.

The multi-layered conductive layer may include metal layers. The metal layers may have, for example, a three-layer structure of titanium/aluminum/titanium. The multi-layered conductive layer may include at least one metal layer and at least one transparent conductive layer.

At least one of the sensing insulating layer 203 or the cover insulating layer 205 may include an inorganic film. The inorganic film may contain at least one of aluminum oxide, titanium oxide, silicon oxide, silicon nitride, silicon oxynitride, zirconium oxide, or hafnium oxide.

At least one of the sensing insulating layer 203 or the cover insulating layer 205 may include an organic film. The organic film may contain at least any one of an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

A parasitic capacitance Cb may be generated between the sensor layer 200 and the second electrode CE. For example, the parasitic capacitance Cb may be generated between the second conductive layer 204 and the second electrode CE. The parasitic capacitance Cb may also be referred to as a base capacitance. As the distance between the sensor layer 200 and the second electrode CE becomes shorter, the parasitic capacitance Cb may increase. As the parasitic capacitance Cb increases, the ratio of the amount of change in capacitance to a reference value may decrease. The amount of change in capacitance refers to a change in capacitance, which occurs before and after an input by an input means, for example, an object 3000 (see FIG. 2).

The sensor driver 200C (see FIG. 2) that processes a signal sensed from the sensor layer 200 may perform leveling operation to remove a value corresponding to the parasitic capacitance Cb from the sensed signal. As the ratio of the amount of change in capacitance to the reference value increases by the leveling operation, sensing sensitivity may be improved.

Figure 5:
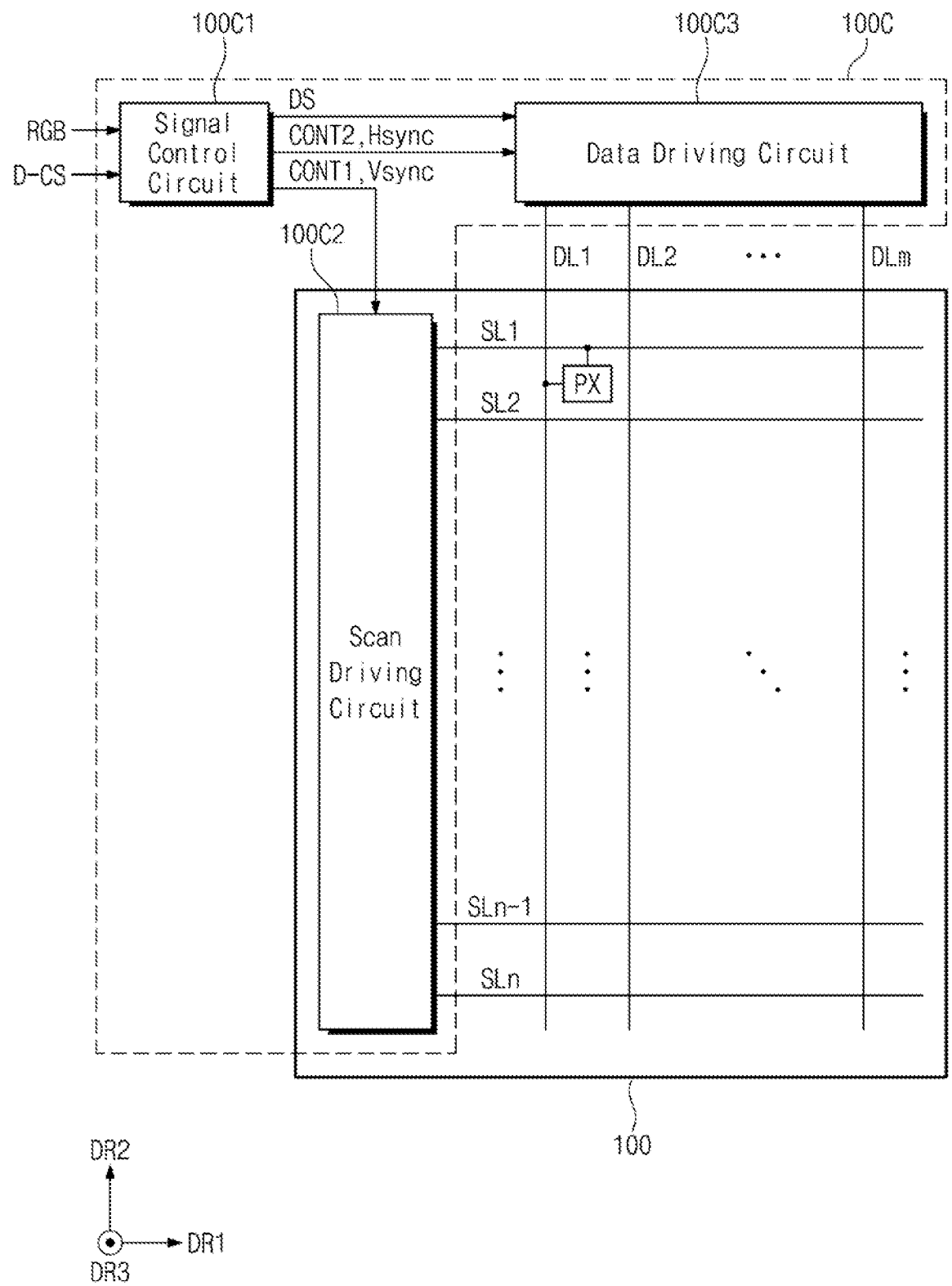
FIG. 5 is a block diagram illustrating a display layer and a display driver according to an embodiment of the inventive concept.

FIG. 5 is a block diagram illustrating a display layer and a display driver according to an embodiment of the inventive concept.

Referring to FIG. 5, the display layer 100 may include a plurality of scan lines SL1-SLn, a plurality of data lines DL1-DLm, and a plurality of pixels PX. Each of the plurality of pixels PX is connected to a corresponding data line among the plurality of data lines DL1 to DLm and is connected to a corresponding scan line among the plurality of scan lines SL1 to SLn. In an embodiment of the inventive concept, the display layer 100 may further include light-emitting control lines, and the display driver 100C may further include a light-emitting driving circuit that provides control signals to the light-emitting control lines. The configuration of the display layer 100 is not particularly limited.

Each of the plurality of scan lines SL1-SLn may extend along the first direction DR1, and the plurality of scan lines SL1-SLn may be arranged to be spaced apart from each other in the second direction DR2. Each of the plurality of data lines DL1 to DLm may extend along the second direction DR2, and each of the plurality of data lines DL1 to DLm may be arranged to be spaced apart from each other in the first direction DR1.

The display driver 100C may include a signal control circuit 100C1, a scan driving circuit 100C2, and a data driving circuit 100C3.

The signal control circuit 100C1 may receive image data RGB and the control signals D-CS from the main driver 1000C (see FIG. 2). The control signals D-CS may include various signals. For example, the control signals D-CS may include an input vertical synchronization signal, an input horizontal synchronization signal, a main clock, a data enable signal, and the like.

The signal control circuit 100C1 may generate a first control signal CONT1 and a vertical synchronization signal Vsync on the basis of the control signals D-CS, and output the first control signal CONT1 and the vertical synchronization signal Vsync to the scan driving circuit 100C2. The vertical synchronization signal Vsync may be included in the first control signal CONT1.

The signal control circuit 100C1 may generate a second control signal CONT2 and a horizontal synchronization signal Hsync on the basis of the control signals D-CS and output the second control signal CONT2 and the horizontal synchronization signal Hsync to the data driving circuit 100C3. The horizontal synchronization signal Hsync may be included in the second control signal CONT2.

In addition, the signal control circuit 100C1 may output, to the data driving circuit 100C3, a driving signal DS obtained by processing image data RGB according to the operating condition of the display layer 100. The first control signal CONT1 and the second control signal CONT2 are not particularly limited as signals necessary for the operation of the scan driving circuit 100C2 and the data driving circuit 100C3.

The scan driving circuit 100C2 drives the plurality of scan lines SL1-SLn in response to the first control signal CONT1 and the vertical synchronization signal Vsync. In an embodiment of the inventive concept, the scan driving circuit 100C2 may be formed in the same process as that of the circuit layer 120 (see FIG. 4) in the display layer 100, but the inventive concept is not limited thereto. For example, the scan driving circuit 100C2 may be implemented as an integrated circuit (IC) and be mounted directly in a predetermined region of the display layer 100, or on a separate printed circuit board in a chip-on-film (COF) method to be electrically connected to the display layer 100.

The data driving circuit 100C3 may output a gradation voltage to the plurality of data lines DL1-DLm in response to the second control signal CONT2, the horizontal synchronization signal Hsync, and the driving signal DS which are transmitted from the signal control circuit 100C1. The data driving circuit 100C3 may be implemented as an integrated circuit and be mounted directly in a predetermined region of the display layer 100, or on a separate printed circuit board in a chip-on-film method to be electrically connected to the display layer 100, but the inventive concept is not particularly limited. For example, the data driving circuit 100C3 may be formed in the same process as that of the circuit layer 120 (see FIG. 4) in the display layer 100.

Figure 6:
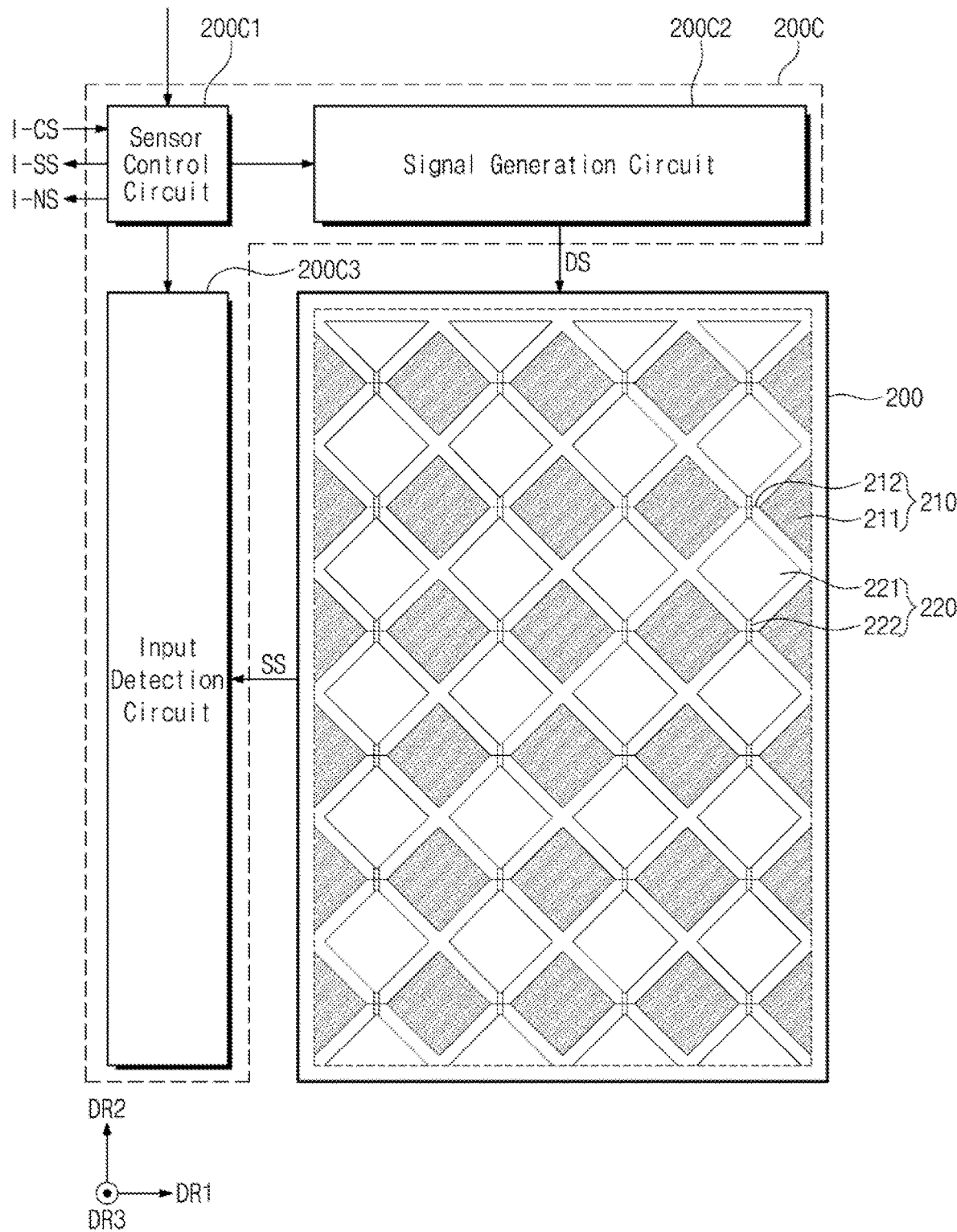
FIG. 6 is a block diagram illustrating a sensor layer and a sensor driver according to an embodiment of the inventive concept.

FIG. 6 is a block diagram illustrating a sensor layer and a sensor driver according to an embodiment of the inventive concept.

Referring to FIG. 6, the sensor layer 200 may include a plurality of cross electrodes 210 and a plurality of electrodes 220. The plurality of cross electrodes 210 may be referred to as second electrodes 210 and the plurality of electrodes 220 may be referred to as first electrodes 220. The plurality of electrodes 220 may cross the plurality of cross electrodes 210. The sensor layer 200 may further include a plurality of signal lines connected to the plurality of cross electrodes 210 and the plurality of electrodes 220.

Each of the plurality of cross electrodes 210 may include a first portion 211 and a second portion 212. The first portion 211 and the second portion 212 may have an integral shape and be disposed in the same layer. For example, the first portion 211 and the second portion 212 may be included in the second conductive layer 204 (see FIG. 4). The second portion 212 may be disposed between two adjacent first portions 211 to connect the two adjacent first portions 211 to each other.

Each of the plurality of electrodes 220 may include a sensing pattern 221 and a bridge pattern 222. Two sensing patterns 221 adjacent to each other may be electrically connected to each other by two bridge patterns 222, but the inventive concept is not particularly limited thereto. The two bridge patterns 222 may insulate and cross the second portion 212. The sensing pattern 221 may be included in the second conductive layer 204 (see FIG. 4), and the bridge pattern 222 may be included in the first conductive layer 202 (see FIG. 4).

The sensor driver 200C may receive a control signal I-CS from the main driver 1000C (see FIG. 2), and provide a coordinate signal I-SS or a proximity signal I-NS (see FIG. 2) to the main driver 1000C (see FIG. 2).

The sensor driver 200C may be implemented as an integrated circuit (IC) and be mounted directly in a predetermined region of the sensor layer 200, or on a separate printed circuit board in a chip-on-film (COF) method to be electrically connected to the sensor layer 200.

The sensor driver 200C may include a sensor control circuit 200C1, a signal generation circuit 200C2, and an input detection circuit 200C3. The sensor control circuit 200C1 may control the operation of the signal generation circuit 200C2 and the input detection circuit 200C3 on the basis of the control signal I-CS.

The signal generation circuit 200C2 may sequentially output the driving signal DS to the sensor layer 200, for example, the electrodes 220. The input detection circuit 200C3 may receive a sensing signal SS from the sensor layer 200. For example, the input detection circuit 200C3 may receive the sensing signal SS from the cross electrodes 210. In an embodiment of the inventive concept, the signal generation circuit 200C2 may sequentially output the driving signal DS to the cross electrodes 210 and receive the sensing signal SS from the electrodes 220.

The input detection circuit 200C3 may convert an analog signal into a digital signal. For example, the input detection circuit 200C3 amplifies and then filters the received analog signal. In other words, the input detection circuit 200C3 may convert the filtered signal into a digital signal.

Figure 7:
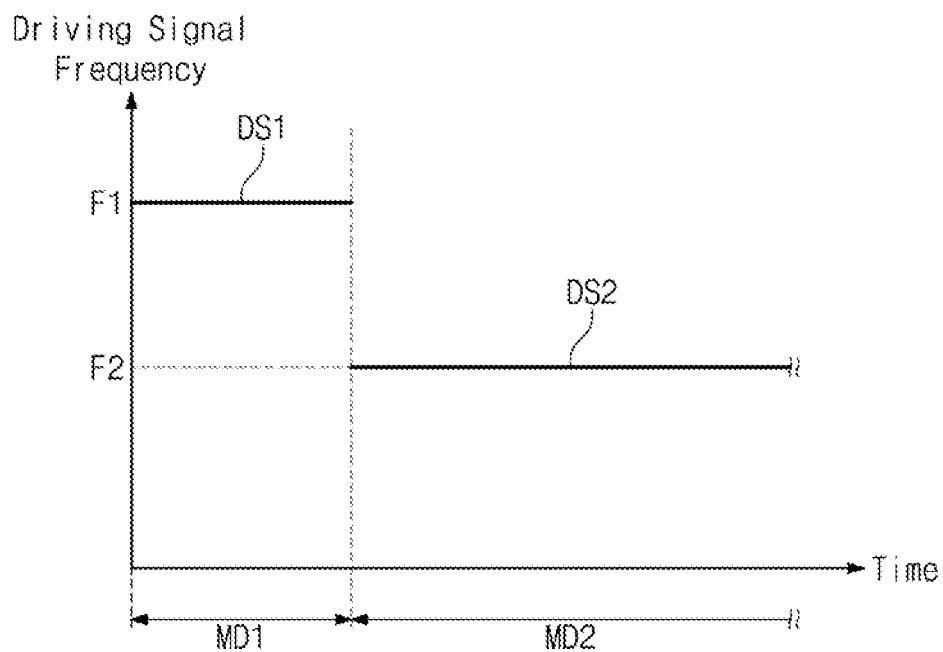
FIG. 7 is a graph illustrating a change in the frequency of a driving signal in accordance with a touch sensing mode and a proximity sensing mode according to an embodiment of the inventive concept.

FIG. 7 is a graph illustrating a change in the frequency of a driving signal in accordance with a touch sensing mode and a proximity sensing mode according to an embodiment of the inventive concept.

Referring to FIGS. 6 and 7, the sensor layer 200 may selectively operate in a touch sensing mode MD1 for detecting the coordinate information of the input 2000 (see FIG. 2) that touches the electronic device 1000 (see FIG. 2), or in a proximity sensing mode MD2 for detecting an object 3000 (see FIG. 2) that approaches the surface of the electronic device 1000 (see FIG. 2). In other words, the sensor layer 200 which operates in the proximity sensing mode MD2 may be used as a proximity sensor. In this case, a proximity sensor for proximity sensing in the electronic device 1000 (see FIG. 1) may be omitted, and accordingly, the manufacturing cost of the electronic device 1000 (see FIG. 1) may be reduced. The touch sensing mode MD1 may be referred to as a first mode, and the proximity sensing mode MD2 may be referred to as a second mode.

The sensor driver 200C may sequentially output a first driving signal DS1 to the electrodes 220 in the touch sensing mode MD1 and may sequentially output a second driving signal DS2 to the electrodes 220 in the proximity sensing mode MD2. A first frequency F1 of the first driving signal DS1 and a second frequency F2 of the second driving signal DS2 may be different from each other. For example, the first frequency F1 of the first driving signal DS1 may be higher than the second frequency F2 of the second driving signal DS2. In addition, an output time of the first driving signal DS1 may be different from an output time of the second driving signal DS2. In other words, a length of the touch sensing mode MD1 may be different from a length of the proximity sensing mode MD2.

The sensor driver 200C may sequentially provide the first driving signal DS1 having the first frequency F1 to the plurality of electrodes 220 in the touch sensing mode MD1. When the display layer 100 (see FIG. 2) displays a predetermined image, or when the operation of the display layer 100 (see FIG. 2) satisfies a predetermined condition, the sensor driver 200C may sequentially provide the second driving signal DS2 having the second frequency F2 to the plurality of electrodes 220.

In an embodiment of the inventive concept, the predetermined image or the predetermined condition may be when an application requiring proximity sensing is executed or when an application requiring proximity sensing is displayed on the display layer 100 (see FIG. 2). For example, the predetermined image may be a dial image, an incoming call image, an outgoing call image, an image during a call, or an image of an application requiring proximity sensing, but the inventive concept is not particularly limited thereto. In addition, the above-described time may be, for example, when a user touches an incoming call icon or when a user touches an outgoing call icon, but the inventive concept is not particularly limited thereto. For example, when the display layer 100 (see FIG. 2) displays a predetermined application screen, the sensor layer 200 may operate in the proximity sensing mode MD2. The sensor driver 200C may receive information saying "Operate in the proximity sensing mode MD2." from the main driver 1000C (see FIG. 2) or from the display driver 100C (see FIG. 2).

The first frequency F1 of the first driving signal DS1 may be selected as a frequency of a range which is less affected by the display layer 100 (see FIG. 2). For example, the first frequency F1 may be selected within the range of about 300 kHz to about 350 kHz, but the inventive concept is not particularly limited thereto.

In the proximity sensing mode MD2, an object 3000 (see FIG. 2) approaching the surface of the electronic device 1000 (see FIG. 2), for example, an car or a cheek, should be detected. The amount of change in capacitance caused by the object 3000 (see FIG. 2) approaching the surface may be smaller than the amount of change in capacitance caused by a touch 2000 (see FIG. 2). Accordingly, to improve sensing sensitivity in proximity sensing, the second frequency F2 of the second driving signal DS2 may be lower than the first frequency F1 of the first driving signal DS1. For example, the second frequency F2 of the second driving signal DS2 may be about ⅓ to about ⅔ of the first frequency F1, and the second frequency F2 of the second driving signal DS2 may be about 100 kHz to about 200 kHz. As far as the second frequency F2 is lower than the first frequency F1, there is no particular limitation thereto.

Figure 8:
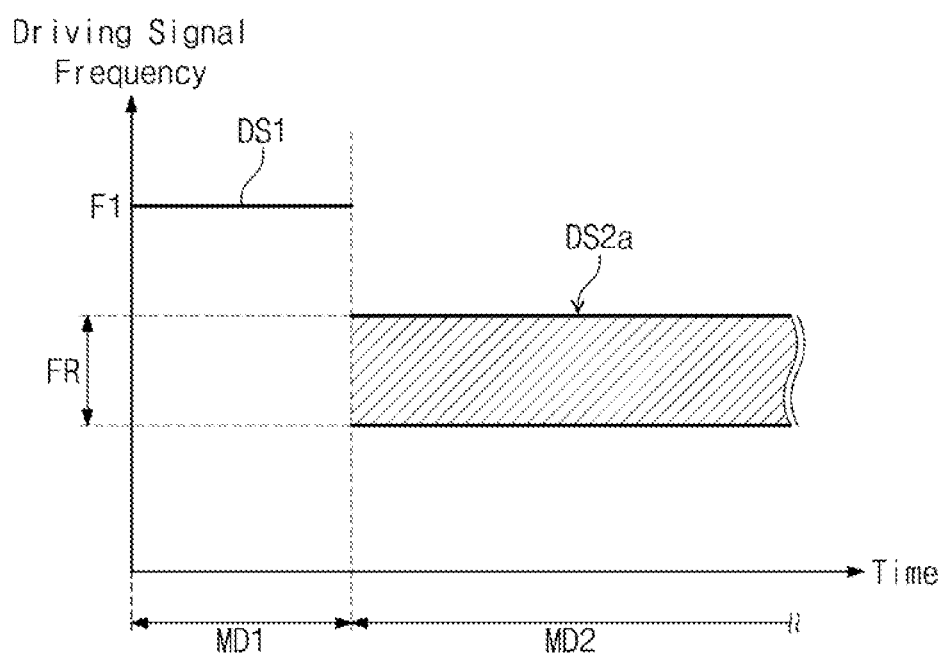
FIG. 8 is a graph illustrating a change in the frequency of a driving signal in accordance with a touch sensing mode and a proximity sensing mode according to an embodiment of the inventive concept.

FIG. 8 is a graph illustrating a change in the frequency of a driving signal in accordance with a touch sensing mode and a proximity sensing mode according to an embodiment of the inventive concept.

Referring to FIGS. 6 and 8, the first frequency F1 of the first driving signal DS1 may be higher than the frequency range FR of a second driving signal DS2a. The sensor driver 200C may sequentially provide the plurality of electrodes 220 with the first driving signal DS1 having the first frequency F1 in the touch sensing mode MD1. When the display layer 100 (see FIG. 2) displays a predetermined image, or when the operation of the display layer 100 (see FIG. 2) satisfies a predetermined condition, the sensor driver 200C may sequentially provide the plurality of electrodes 220 with the second driving signal DS2a having a frequency within the frequency range FR in the proximity sensing mode MD2.

Figure 9A:
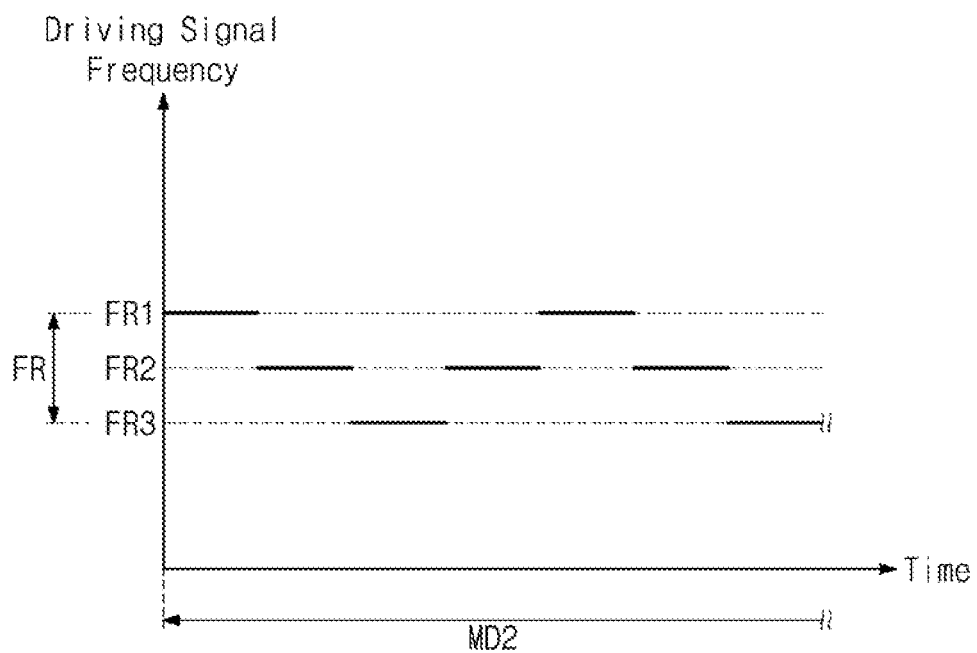
FIG. 9A is a graph illustrating a change in the frequency of a driving signal in accordance with a proximity sensing mode according to an embodiment of the inventive concept.
Figure 9B:
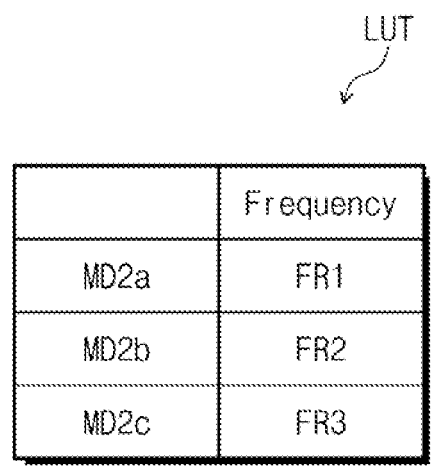
FIG. 9B illustrates a lookup table according to an embodiment of the inventive concept.

FIG. 9A is a graph illustrating a change in the frequency of a driving signal in accordance with a proximity sensing mode according to an embodiment of the inventive concept. FIG. 9B illustrates a lookup table according to an embodiment of the inventive concept.

Referring to FIGS. 6, 8, 9A, and 9B, the frequency of the second driving signal DS2a may be hopped within the frequency range FR. In other words, the frequency of the second driving signal DS2a may change to have different levels within the frequency range FR. For example, the second driving signal DS2a may be hopped to a first frequency FR1, a second frequency FR2, or a third frequency FR3.

The sensor driver 200C may include a lookup table LUT. The lookup table LUT may have information on frequency values operable in the proximity sensing mode MD2. For example, the lookup table LUT may include information on the first to third frequencies FR1, FR2, and FR3 corresponding respectively to indexes MD2a. MD2b, and MD2c. FIG. 9B illustrates the three frequencies FR1, FR2, and FR3, but the inventive concept is not limited thereto, and the number of frequencies stored in the lookup table LUT may be two or four or more.

All of the first to third frequencies FR1, FR2, and FR3 of the second driving signal DS2a in the proximity sensing mode MD2 may be lower than the first frequency F1 of the first driving signal DS1 in the touch sensing mode MD1. As the frequency of the second driving signal DS2a relatively decreases, the absolute value of the digital signal converted from the sensing signal SS, which is received from the cross electrodes 210, may increase. Accordingly, proximity sensing sensitivity in the proximity sensing mode MD2 may be improved.

Figure 10:
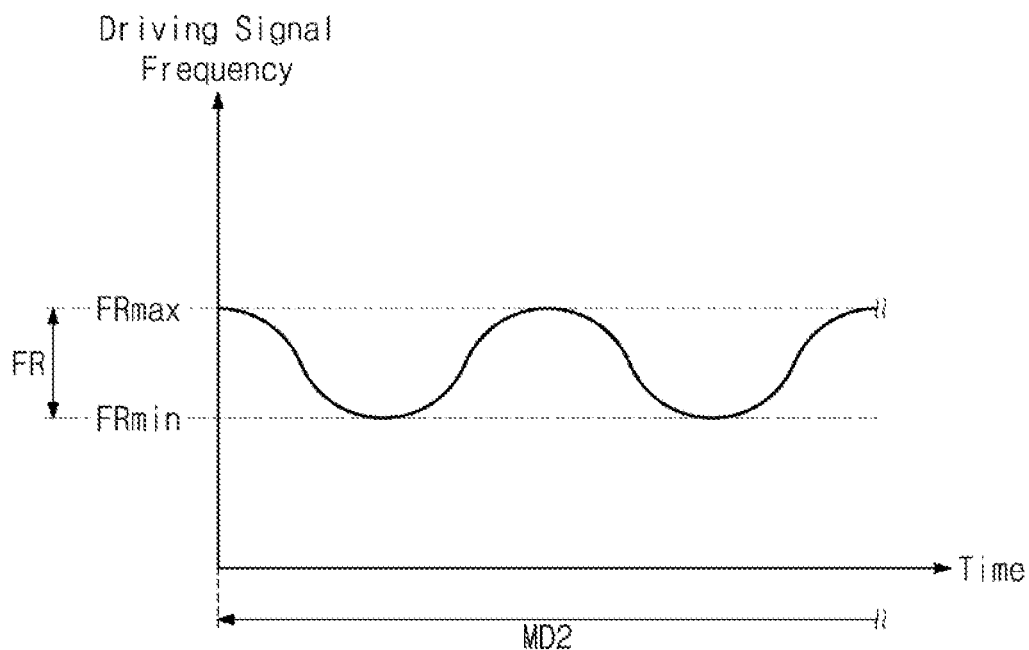
FIG. 10 is a graph illustrating a change in the frequency of a driving signal in accordance with a proximity sensing mode according to an embodiment of the inventive concept.

FIG. 10 is a graph illustrating a change in the frequency of a driving signal in accordance with a proximity sensing mode according to an embodiment of the inventive concept.

Referring to FIGS. 6, 8, and 10, the frequency of the second driving signal DS2a may swing within the frequency range FR. While FIG. 9A shows that the frequency of the second driving signal DS2a is converted into a specific frequency, FIG. 10 shows that the second driving signal DS2a may be continuously changed over time. For example, the frequency of the second driving signal DS2a may swing between the maximum frequency FRmax and the minimum frequency FRmin of the frequency range FR. The maximum frequency FRmax may be lower than the first frequency F1 of the first driving signal DS1.

Figure 11:
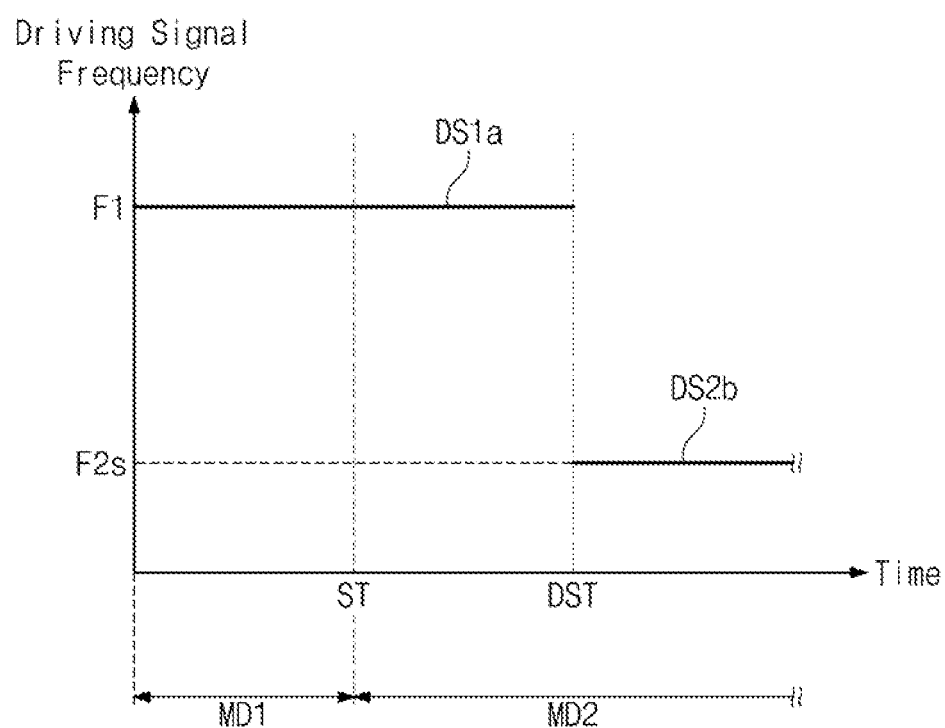
FIG. 11 is a graph illustrating a change in the frequency of a driving signal in accordance with a touch sensing mode and a proximity sensing mode according to an embodiment of the inventive concept.

FIG. 11 is a graph illustrating a change in the frequency of a driving signal in accordance with a touch sensing mode and a proximity sensing mode according to an embodiment of the inventive concept.

Referring to FIGS. 6 and 11, from the time DST when the sensor driver 200C enters the proximity sensing mode MD2 and the display layer 100 (see FIG. 2) displays a still image, the sensor driver 200C may sequentially provide a second driving signal DS2b to the plurality of electrodes 220. In other words, the second driving signal DS2b may be provided to the plurality of electrodes 220 when the display layer 100 (see FIG. 2) displays a predetermined image, for example, a still image.

In this embodiment, the sensor driver 200C may not lower the first frequency F1 of a driving signal DS1a, which is provided to the plurality of electrodes 220, until it is determined that the display layer 100 (see FIG. 2) displays a still image. When the display layer 100 (see FIG. 2) displays a still image, noise included in the sensing signal SS and caused by the display layer 100 (see FIG. 2) may be reduced. As the noise decreases, the noise removal operation of the sensor driver 200C may be easily performed. Accordingly, the sensor driver 200C may improve sensing sensitivity by lowering the frequency of the second driving signal DS2b in a section in which noise is low.

Whether or not the display layer 100 (refer to FIG. 2) displays a still image may be checked on the basis of the amount of change in a sensed value for each frame. For example, when the amount of change in the sensed value is less than or equal to a predetermined reference value, the sensor driver 200C may determine that the display layer 100 (see FIG. 2) displays a still image, and may sequentially provide the plurality of electrodes 220 with the second driving signal DS2b having a second frequency F2s. Alternatively, the sensor driver 200C may receive, from the main driver 1000C (see FIG. 2) or the display driver 100C (see FIG. 2), information indicating that the display layer 100 (see FIG. 2) displays a still image.

Figure 12:
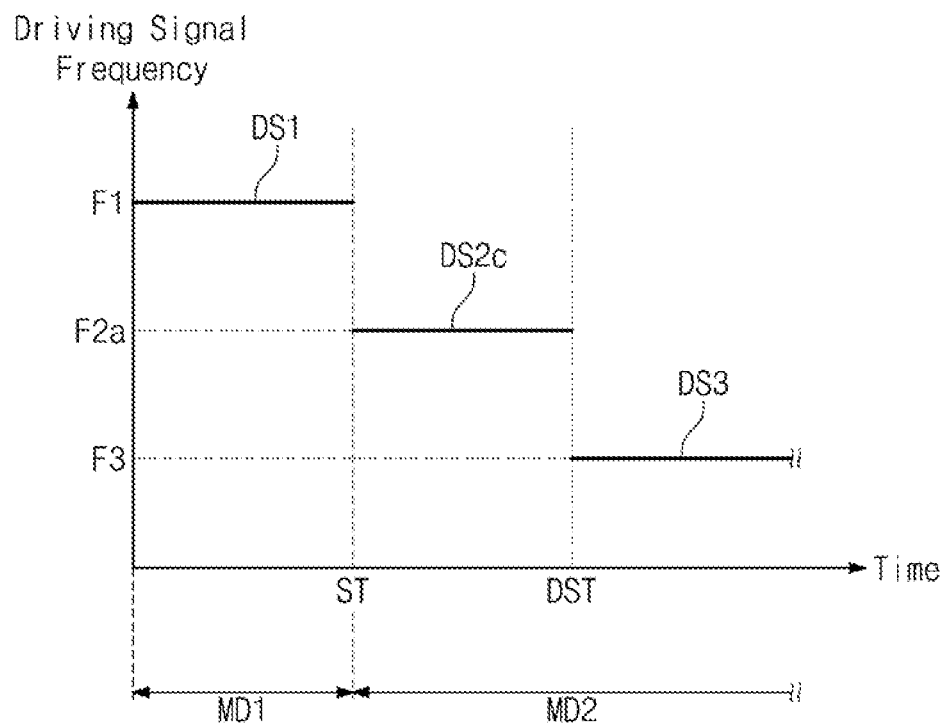
FIG. 12 is a graph illustrating a change in the frequency of a driving signal in accordance with a touch sensing mode and a proximity sensing mode according to an embodiment of the inventive concept.

FIG. 12 is a graph illustrating a change in the frequency of a driving signal in accordance with a touch sensing mode and a proximity sensing mode according to an embodiment of the inventive concept.

Referring to FIGS. 6 and 12, from the time ST when the sensor driver 200C enters the proximity sensing mode MD2, the sensor driver 200C may sequentially provide the electrodes 220 with a second driving signal DS2c having a second frequency F2a lower than the first frequency F1 of the first driving signal DS1. In a state in which the sensor driver 200C has entered the proximity sensing mode MD2 and from the time DST when it is determined that the display layer 100 (see FIG. 2) displays a still image, the sensor driver 200C may sequentially provide the electrodes 220 with a third driving signal DS3 having a third frequency F3 lower than the second frequency F2a of the second driving signal DS2c. For example, the first frequency F1 may be about 300 kHz, the second frequency F2a may be about 200 kHz, and the third frequency F3 may be about 100 kHz, but the inventive concept is not particularly limited thereto. For example, the third frequency F3 may be the same as the second frequency F2 or greater than the second frequency F2.

According to an embodiment of the inventive concept, in the proximity sensing mode MD2, a driving signal having a different frequency may be provided to the sensor layer 200 depending on whether the display layer 100 (see FIG. 2) displays a moving image or a still image. Accordingly, sensing sensitivity in proximity sensing may be further improved in a section in which noise is low.

Each of the second frequency F2a of the second driving signal DS2c and the third frequency F3 of the third driving signal DS3 may be provided in a frequency range FR as described in FIG. 8. In this case, the frequency of each of the second driving signal DS2c and the third driving signal DS3 may hop or swing within the frequency range FR.

Figure 13:
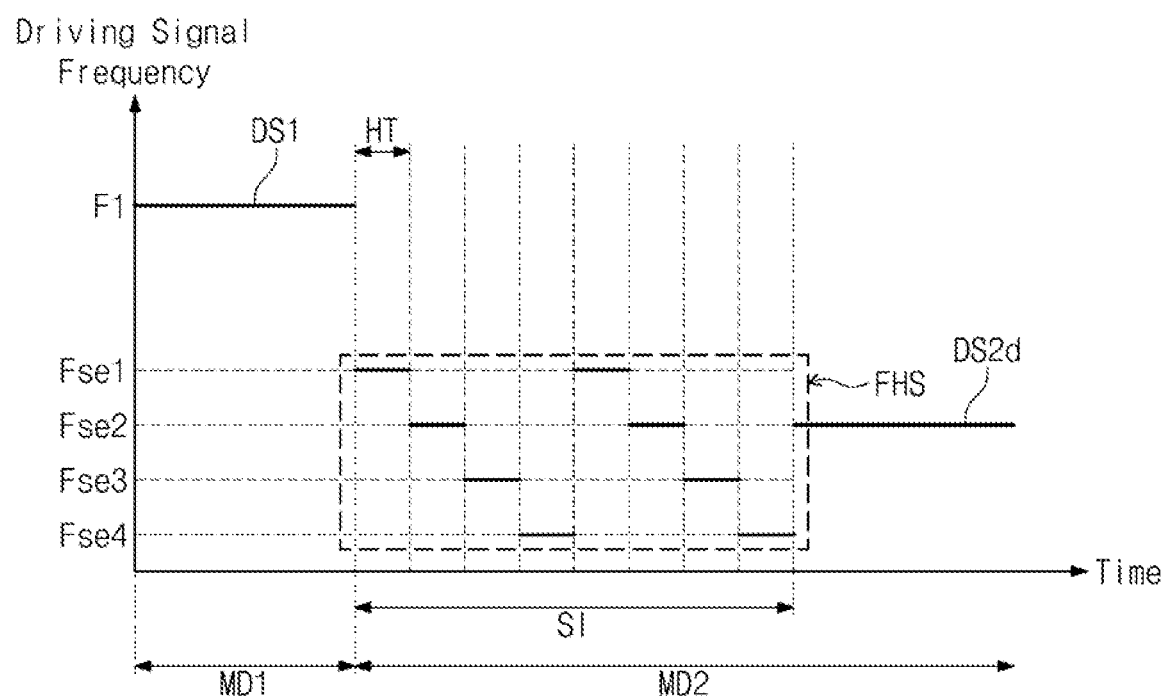
FIG. 13 is a graph illustrating a change in the frequency of a driving signal in accordance with a touch sensing mode and a proximity sensing mode according to an embodiment of the inventive concept.

FIG. 13 is a graph illustrating a change in the frequency of a driving signal in accordance with a touch sensing mode and a proximity sensing mode according to an embodiment of the inventive concept.

Referring to FIGS. 6 and 13, the sensor driver 200C may operate in a search mode SI when entering the proximity sensing mode MD2. The frequency of a second driving signal DS2d may be a determined frequency determined in the search mode SI.

In the search mode SI, the sensor driver 200C outputs a frequency hopping signal FHS, and may determine a determined frequency on the basis of signal-to-noise ratios of signals received from the sensor layer 200 for each frequency.

FIG. 13 illustrates that the frequency hopping signal FHS is hopped to first, second, third and fourth, hopping frequencies Fse1, Fse2, Fse3, and Fse4 during the search mode SI, but the inventive concept is not particularly limited thereto. For example, the frequency hopping signal FHS may be hopped to two or more frequencies. The first to fourth hopping frequencies Fse1, Fse2, Fse3, and Fse4 may all be lower than the first frequency F1 of the first driving signal DS1. The first hopping frequency Fse1 may be the highest hopping frequency and the fourth hopping frequency Fse4 may be the lowest hopping frequency.

The frequency of the frequency hopping signal FHS may be changed to a different frequency every horizontal period HT of the sensor driver 200C, but the frequency change period is not particularly limited thereto. For example, the frequency of the frequency hopping signal FHS may be changed every two horizontal periods HT. The frequency of the hopping signal FRS may sequentially decrease and increase.

The sensor driver 200C may determine one of the first to fourth hopping frequencies Fse1, Fse2, Fse3, and Fse4 as a second frequency of the second driving signal DS2d in consideration of the intensity and noise level of each of signals according to the first to fourth hopping frequencies Fse1, Fse2, Fse3, and Fse4. In this case, in the proximity sensing mode MD2, the second driving signal DS2d having a frequency suitable for proximity sensing according to a user interface may be provided to the electrodes 220.

According to an embodiment of the inventive concept, as described above with reference to FIGS. 2, 6, and 7 to 13, the electronic device 1000 includes: a display layer 100 configured to display images; a sensor layer 200 disposed on the display layer 100 and including a plurality of first electrodes 220 and a plurality of second electrodes 210; and a sensor driver 200C configured to drive the sensor layer 200, wherein the sensor driver 200C is configured to sequentially provide a first driving signal DS1 to the plurality of first electrodes 220 and, when the display layer 100 displays a predetermined image, the sensor driver 200C is configured to provide a second driving signal DS2 having a frequency, e.g., F2, different from that of the first driving signal DS1, e.g., F1, to the plurality of first electrodes 220.

Figure 14:
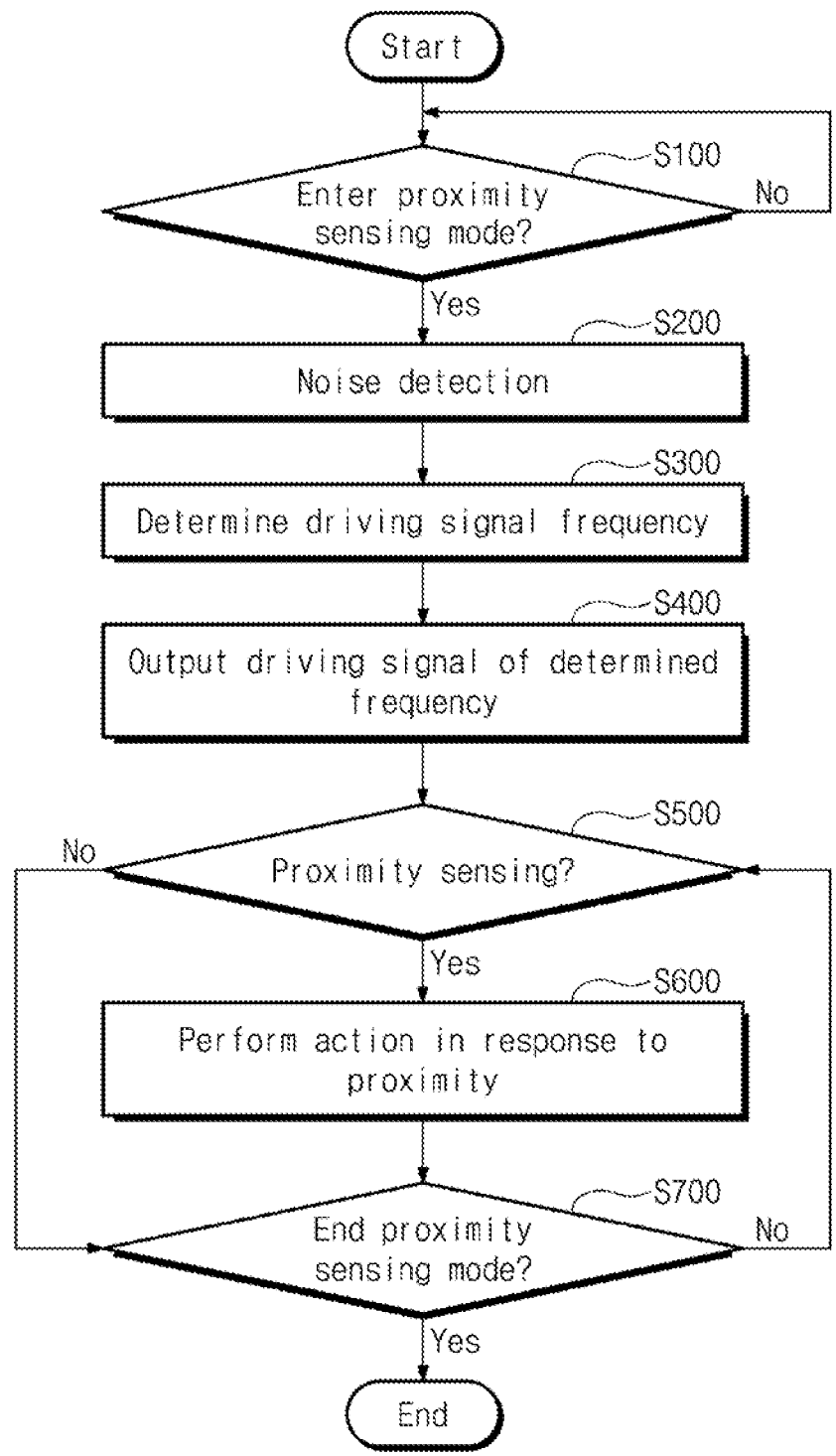
FIG. 14 is a flowchart for explaining an operation in a proximity sensing mode according to an embodiment of the inventive concept.

FIG. 14 is a flowchart for explaining an operation in a proximity sensing mode according to an embodiment of the inventive concept.

Referring to FIGS. 6 and 14, the sensor driver 200C determines whether to operate in the proximity sensing mode or in the touch sensing mode (S100). When entering the proximity sensing mode, the sensor driver 200C detects noise by using the sensor layer 200 (S200).

The sensor driver 200C determines the frequency of the driving signal DS on the basis of noise detected through the sensor layer 200 (S300). The sensor driver 200C sequentially outputs the driving signal DS having the determined frequency to the plurality of electrodes 220 of the sensor layer 200 (S400).

The main driver 1000C (see FIG. 2) receives a proximity signal I-NS from the sensor driver 200C and determines whether or not an object has come within a particular proximity to the electronic device 1000 (see FIG. 2) based on the proximity signal I-NS (S500). As a result of the determination, when a proximity occurs, an action in response to the object, for example, turning off the display screen, may be performed (S600). However, when proximity does not occur, whether or not to end the proximity sensing mode (S700) may be determined. In case the proximity sensing mode should be ended as a result of the determination, an ending procedure should be performed, and in case the proximity sensing mode should not be ended, the main driver 1000C may move back to step S500 to perform again the operation of determining whether or not proximity occurs.

Figure 15:
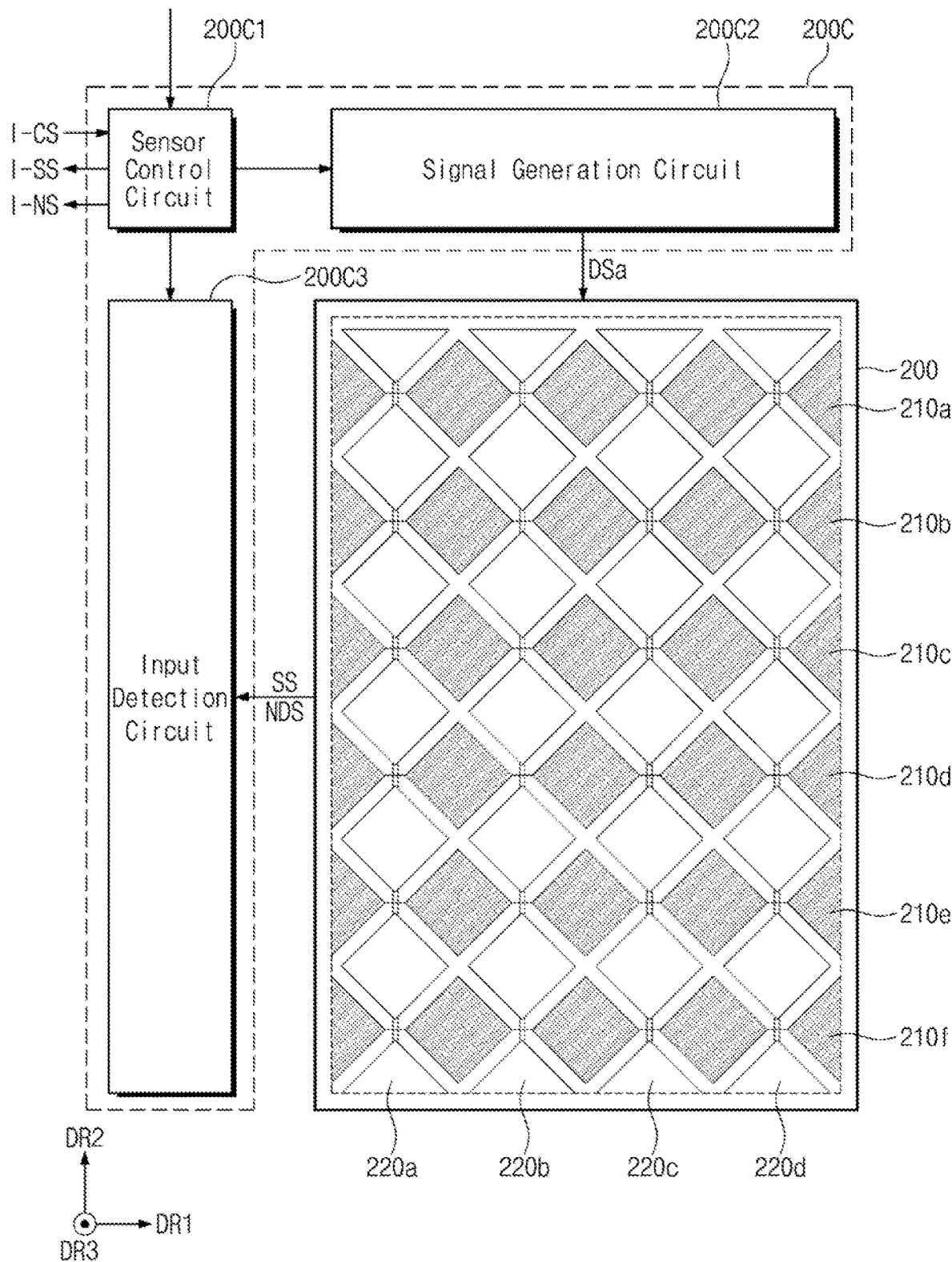
FIG. 15 is a block diagram illustrating a sensor layer and a sensor driver according to an embodiment of the inventive concept.

FIG. 15 is a block diagram illustrating a sensor layer and a sensor driver according to an embodiment of the inventive concept.

With reference to FIG. 15, the operation of detecting noise will be described by using the sensor layer 200.

The sensor driver 200C may receive a noise-determining signal NDS from the sensor layer 200. After detecting noise on the basis of the noise-determining signal NDS, the sensor driver 200C may determine the frequency of the second driving signal DSa according to the degree of noise.

For example, the noise-determining signal NDS may be provided from one of the electrodes which output the sensing signal SS. In other words, the noise-determining signal NDS may be provided from one of a plurality of crossing electrodes 210a. 210b, 210c, 210d, 210e, and 210f.

Alternately, the sensor driver 200C may sequentially receive the noise-determining signal NDS from at least one electrode, which is not in the order to receive the first driving signal or the second driving signal, among a plurality of electrodes 220a, 220b, 220c, and 220d, or from at least one cross electrode, which is not in the order to output the sensing signal SS, among the plurality of cross electrodes 210a, 210b, 210c, 210d, 210e, and 210f.

Figure 16:
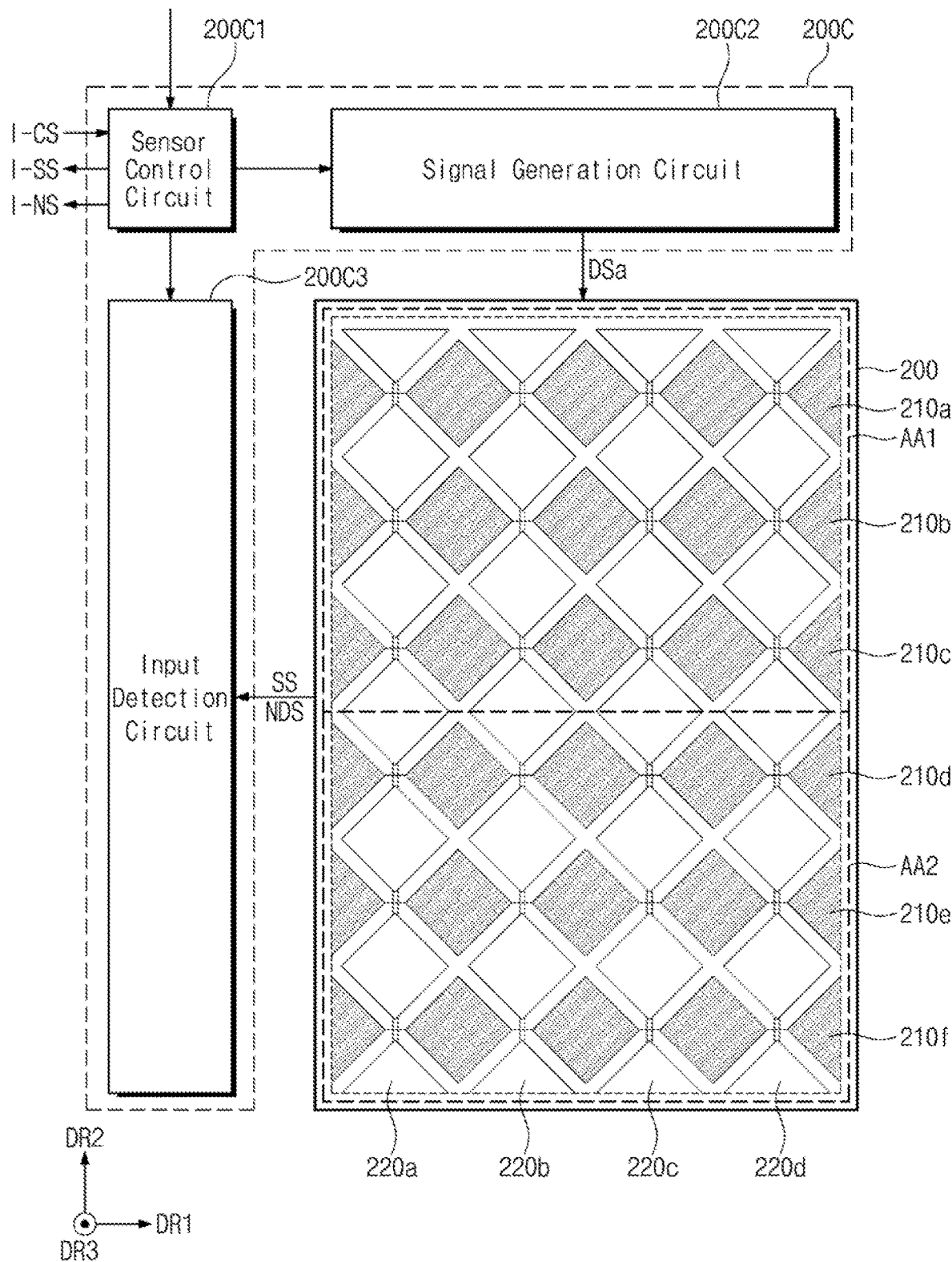
FIG. 16 is a block diagram illustrating a sensor layer and a sensor driver according to an embodiment of the inventive concept.

FIG. 16 is a block diagram illustrating a sensor layer and a sensor driver according to an embodiment of the inventive concept.

With reference to FIG. 16, the operation of detecting noise will be described by using the sensor layer 200.

The sensor layer 200 may include a first region AA1 that is activated in the proximity sensing mode and a second region AA2 that is deactivated in the proximity sensing mode. In other words, the first region AA1 may be activated in the second mode and the second region AA2 may be deactivated in the second mode. In this case, the sensor layer 200 may receive the noise-determining signal NDS from one electrode or cross electrode disposed in the second region AA2.

For example, in FIG. 16, three cross electrodes 210d, 210e, and 210f may be disposed in the second region AA2. The sensor driver 200C may receive the noise-determining signal NDS from at least any one of the three cross electrodes 210d. 210e, and 210f. In the alternative, the first region AA1 may be deactivated in the proximity sensing mode and the second region AA2 may be activated in the proximity sensing mode. In this case, the sensor layer 200 may receive the noise-determining signal NDS from one electrode or cross electrode disposed in the first region AA1.

Figure 17A:
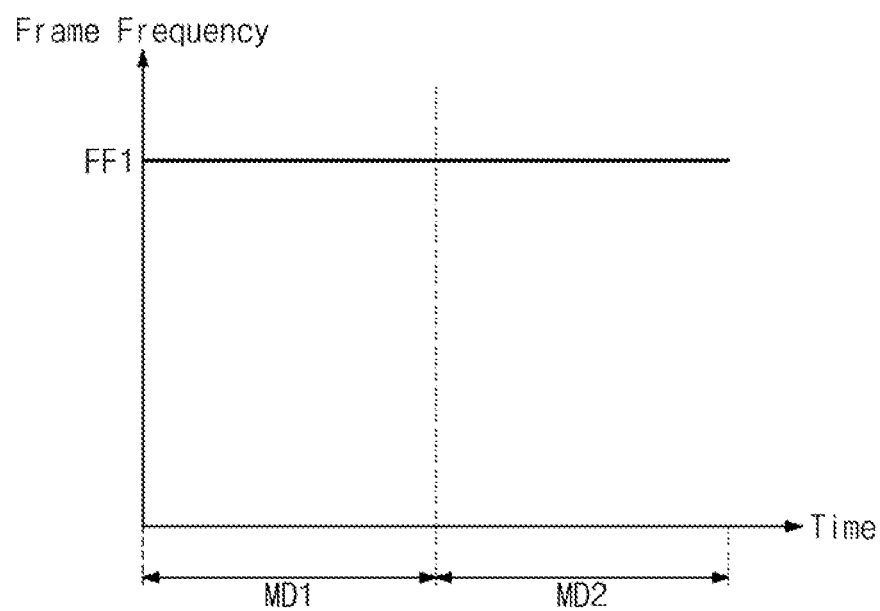
FIG. 17A is a graph illustrating a change in frame frequency in accordance with a touch sensing mode and a proximity sensing mode according to an embodiment of the inventive concept.

FIG. 17A is a graph illustrating a change in frame frequency in accordance with a touch sensing mode and a proximity sensing mode according to an embodiment of the inventive concept.

Referring to FIGS. 6 and 17A, the sensor layer 200 may selectively operate in a touch sensing mode MD1 for detecting the coordinate information of an input 2000 (see FIG. 2) by touching an electronic device 1000 (see FIG. 2), or in a proximity sensing mode MD2 for detecting an object 3000 (see FIG. 2) approaching the surface of the electronic device 1000 (see FIG. 2).

As described above with reference to FIGS. 6, 7, 8, 9A, 10, 11, 12, and 13, the frequencies of the driving signal provided to the sensor layer 200 in the touch sensing mode MD1 and the proximity sensing mode MD2 may be different from each other, but the operating frequencies of the sensor layer 200 may be the same as each other. In other words, the sensor layer 200 may operate at a first frame frequency FF1 in the touch sensing mode MD1 and the proximity sensing mode MD2. The report rates of the sensor layer 200 in the touch sensing mode MD1 and the proximity sensing mode MD2 may be the same as each other. The first frame frequency FF1 may be 480 Hz, 240 Hz, 120 Hz. or 60 Hz, but the inventive concept is not particularly limited.

Figure 17B:
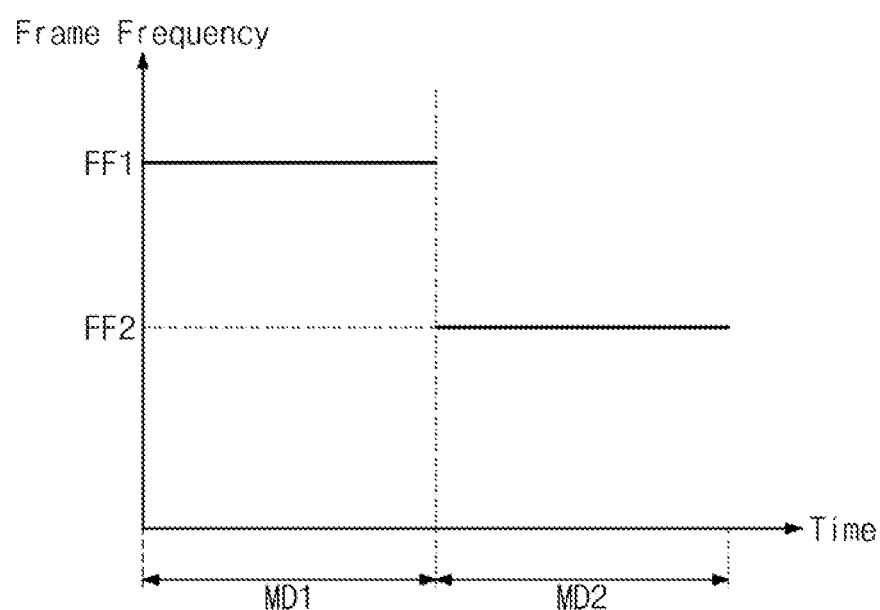
FIG. 17B is a graph illustrating a change in frame frequency in accordance with a touch sensing mode and a proximity sensing mode according to an embodiment of the inventive concept.

FIG. 17B is a graph illustrating a change in frame frequency in accordance with a touch sensing mode and a proximity sensing mode according to an embodiment of the inventive concept.

Referring to FIGS. 6 and 17B, the operating frequencies of the sensor layer 200 in the touch sensing mode MD1 and the proximity sensing mode MD2 may be different from each other. For example, as described above with reference to FIGS. 6, 7, 8, 9A, 10, 11, 12, and 13, the frequencies of the driving signal provided to the sensor layer 200 in the touch sensing mode MD1 and the proximity sensing mode MD2 may be different from each other, and the operating frequencies of the sensor layer 200 may also be different from each other.

For example, the sensor layer 200 may operate at the first frame frequency FF1 in the touch sensing mode MD1 and at a second frame frequency FF2 in the proximity sensing mode MD2. The second frame frequency FF2 may be lower than the first frame frequency FF1. For example, when the first frame frequency FF1 is about 120 Hz, the second frame frequency FF2 may be about 60 Hz. However, this is only an example, and the first frame frequency FF1 and the second frame frequency FF2 are not limited to the above-described example.

As the second frame frequency FF2 is set to be lower than the first frame frequency FF1 in the proximity sensing mode MD2, the application time of the driving signal may increase. In this case, the possible proximity sensing distance of the sensor layer 200 may increase. In addition, as the amount of change in capacitance increases when an object approaches, proximity sensing sensitivity may be further improved.

As described above, the sensor layer may selectively operate in a touch sensing mode or in a proximity sensing mode. The frequency of the driving signal in the proximity sensing mode may be lower than the frequency of the driving signal in the touch sensing mode. As the frequency of the driving signal decreases in the proximity sensing mode, the absolute value of the digital signal converted from the sensing signal sensed from the sensor layer may increase. Accordingly, proximity sensing sensitivity in the proximity sensing mode may be improved.

In addition, since the sensor layer is used as a proximity sensor, a separate sensor for proximity sensing in the electronic device may be omitted. Accordingly, the manufacturing cost of the electronic device may be reduced.

While embodiments of the inventive concept have been described, those skilled in the art or those of ordinary skill in the art will understand that the inventive concept may be variously modified and changed within the scope of the inventive concept as hereinafter claimed. Therefore, the disclosed subject matter should not be limited to the embodiments described herein.

What is claimed is:

1. An electronic device, comprising:
  a display layer configured to display images;
  a sensor layer disposed on the display layer and including a plurality of first electrodes and a plurality of second electrodes; and
  a sensor driver configured to drive the sensor layer,
  wherein the sensor driver is configured to sequentially provide a first driving signal to the plurality of first electrodes and, when the display layer displays a predetermined image, the sensor driver is configured to provide a second driving signal having a second frequency different from a first frequency of the first driving signal to the plurality of first electrodes, wherein, when the sensor driver is in a proximity sensing mode and the display layer displays a still image, the sensor driver sequentially provides the second driving signal to the plurality of first electrodes, and the sensor driver determines whether or not the display layer displays the still image on a basis of an amount of change in a sensing value for each frame, which is sensed from the plurality of second electrodes.

2. The electronic device of claim 1, wherein the first frequency of the first driving signal is higher than the second frequency of the second driving signal.

3. The electronic device of claim 1, wherein the first frequency of the first driving signal is higher than a frequency range of the second driving signal.

4. The electronic device of claim 3, wherein the second frequency of the second driving signal hops within the frequency range.

5. The electronic device of claim 4, wherein the sensor driver comprises a lookup table in which frequency information about the frequency range is stored.

6. The electronic device of claim 3, wherein the second frequency of the second driving signal swings within the frequency range.

7. The electronic device of claim 1, wherein the predetermined image is a dial image, an incoming call image, an outgoing call image, an image during a call, or an image of an application requiring proximity sensing.

8. The electronic device of claim 1, wherein:

the sensor layer operates in a touch sensing mode for detecting a coordinate information of an input by touching the electronic device or in the proximity sensing mode for detecting an object approaching a surface of the electronic device;

the sensor layer operates at a first frame frequency in the touch sensing mode; and the sensor layer operates at a second frame frequency equal to or less than the first frame frequency in the proximity sensing mode.

9. An electronic device, comprising:

a display layer configured to display images;

a sensor layer disposed on the display layer and including a plurality of first electrodes and a plurality of second electrodes; and a sensor driver configured to drive the sensor layer, wherein the sensor driver is configured to sequentially provide a first driving signal to the plurality of first electrodes and, when the display layer displays a predetermined image, the sensor driver is configured to provide a second driving signal having a second frequency different from a first frequency of the first driving signal to the plurality of first electrodes, when entering a proximity sensing mode, the sensor driver sequentially provides the second driving signal to the plurality of first electrodes, and when the display layer displays a still image when the sensor driver is in the proximity sensing mode, the sensor driver sequentially provides the plurality of first electrodes with a third driving signal having a third frequency different from the second frequency of the second driving signal.

10. The electronic device of claim 9, wherein:

the first frequency of the first driving signal is higher than the second frequency of the second driving signal; and the second frequency of the second driving signal is higher than the third frequency of the third driving signal.

11. An electronic device, comprising:

a display layer configured to display images;

a sensor layer disposed on the display layer and including a plurality of first electrodes and a plurality of second electrodes; and a sensor driver configured to drive the sensor layer, wherein the sensor driver is configured to sequentially provide a first driving signal to the plurality of first electrodes and, when the display layer displays a predetermined image, the sensor driver is configured to provide a second driving signal having a second frequency different from a first frequency of the first driving signal to the plurality of first electrodes, the sensor driver operates in a search mode when entering a proximity sensing mode, the second frequency of the second driving signal is determined through the search mode, and in the search mode, the sensor driver outputs a frequency hopping signal and determines the second frequency of the second driving signal on a basis of a signal-to-noise ratio of signals received from the sensor layer for each frequency.

12. The electronic device of claim 11, wherein:

a frequency of the frequency hopping signal is changed to a different frequency every horizontal period of the sensor driver; and frequencies of the frequency hopping signal are lower than the first frequency of the first driving signal.

13. An electronic device, comprising:

a display layer configured to display images;

a sensor layer disposed on the display layer and including a plurality of first electrodes and a plurality of second electrodes; and a sensor driver configured to drive the sensor layer, wherein the sensor driver is configured to sequentially provide a first driving signal to the plurality of first electrodes and, when the display layer displays a predetermined image, the sensor driver is configured to provide a second driving signal having a second frequency different from a first frequency of the first driving signal to the plurality of first electrodes, the sensor driver receives a noise-determining signal from the sensor layer, detects noise on a basis of the noise-determining signal, and then determines the second frequency of the second driving signal according to a level of the noise, the sensor driver sequentially receives sensing signals from the plurality of second electrodes, and the sensor driver receives the noise-determining signal from at least one first electrode, which is not in the order which the first driving signal or the second driving signal is provided, among the plurality of first electrodes, or from at least one second electrode, which is not in the order to output a sensing signal among the sensing signals, among the plurality of second electrodes.

14. An electronic device, comprising:

a display layer configured to display images;

a sensor layer disposed on the display layer and including a plurality of first electrodes and a plurality of second electrodes; and a sensor driver configured to drive the sensor layer, wherein the sensor driver is configured to sequentially provide a first driving signal to the plurality of first electrodes and, when the display layer displays a predetermined image, the sensor driver is configured to provide a second driving signal having a second frequency different from a first frequency of the first driving signal to the plurality of first electrodes, the sensor driver receives a noise-determining signal from the sensor layer, detects noise on a basis of the noise-determining signal, and then determines the second frequency of the second driving signal according to a level of the noise, the sensor layer operates in a touch sensing mode for detecting a coordinate information of an input that touches the electronic device or in a proximity sensing mode for detecting an object approaching a surface of the electronic device, the sensor layer includes a first region which is activated in the proximity sensing mode and a second region which is adjacent to the first region and deactivated in the proximity sensing mode, and the sensor driver receives the noise-determining signal from at least one first electrode or a second electrode disposed in the second region among the plurality of first electrodes and the plurality of second electrodes.

* * * * *